United States Patent
Jung et al.

(10) Patent No.: US 11,799,995 B2
(45) Date of Patent: Oct. 24, 2023

(54) FOLDABLE ELECTRONIC DEVICE AND METHOD THEREFOR

(71) Applicant: Samsung Electronics Co., Ltd., Suwon-si (KR)

(72) Inventors: Hojin Jung, Suwon-si (KR); Yongyoun Kim, Suwon-si (KR); Myeongsu Oh, Suwon-si (KR); Duho Chu, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 17/105,800

(22) Filed: Nov. 27, 2020

(65) Prior Publication Data
US 2021/0168227 A1 Jun. 3, 2021

(30) Foreign Application Priority Data
Nov. 29, 2019 (KR) .................. 10-2019-0157494

(51) Int. Cl.
  *H04M 1/02* (2006.01)
  *H04L 5/14* (2006.01)
(52) U.S. Cl.
  CPC ............ *H04M 1/0245* (2013.01); *H04L 5/14* (2013.01); *H04M 1/0216* (2013.01)
(58) Field of Classification Search
  CPC ..... H04L 5/14; H04M 1/0216; H04M 1/0245; H04M 1/724; H04M 2201/34; H04M 2250/12; H01Q 1/243; H01Q 1/525; H01Q 5/35; H01Q 9/42; H01Q 21/205; H01Q 25/00; H04B 1/40
  See application file for complete search history.

(56) References Cited

U.S. PATENT DOCUMENTS

| | | | | |
|---|---|---|---|---|
| 6,757,267 | B1 * | 6/2004 | Evans | H04B 7/0615 343/834 |
| 10,615,485 | B2 * | 4/2020 | Chun | G06F 1/1698 |
| 11,171,407 | B2 * | 11/2021 | Jung | H03F 3/72 |
| 2003/0045246 | A1 | 3/2003 | Lee et al. | |
| 2018/0366813 | A1 * | 12/2018 | Kim | H01Q 1/24 |

(Continued)

FOREIGN PATENT DOCUMENTS

| | | |
|---|---|---|
| JP | 2000-031889 A | 1/2000 |
| KR | 10-2005-0060509 A | 6/2005 |

(Continued)

OTHER PUBLICATIONS

International Search Report dated Mar. 26, 2021, issued in International Application No. PCT/KR2020/017135.

*Primary Examiner* — Ricardo H Castaneyra
(74) *Attorney, Agent, or Firm* — Jefferson IP Law, LLP

(57) ABSTRACT

An electronic device is provided. The electronic device includes a housing including a first housing structure and a second housing structure, at least a portion of the first housing structure is formed with a metallic material to form at least one first antenna, and at least another portion of the first housing structure is formed with a nonmetallic material to isolate the at least one first antenna, and at least a portion of the second housing structure is formed with a metallic material to form at least one second antenna, and at least another portion of the second housing structure is formed with a nonmetallic material to isolate the at least one second antenna.

20 Claims, 14 Drawing Sheets

(56) References Cited

U.S. PATENT DOCUMENTS

2019/0007533 A1\* 1/2019 Kim ..................... H01Q 1/243
2020/0176854 A1    6/2020 Jung

FOREIGN PATENT DOCUMENTS

| KR | 10-0642248 B1    | 11/2006 |
|----|------------------|---------|
| KR | 10-2014-0105886 A | 9/2014  |
| KR | 10-2019-0017138 A | 2/2019  |
| WO | 2019/031731 A1   | 2/2019  |

\* cited by examiner

FOLDABLE ELECTRONIC DEVICE AND METHOD THEREFOR

CROSS-REFERENCE TO RELATED APPLICATION(S)

This application is based on and claims priority under 35 U.S.C. § 119(a) of a Korean patent application number 10-2019-0157494, filed on Nov. 29, 2019, in the Korean Intellectual Property Office, the disclosure of which is incorporated by reference herein in its entirety.

BACKGROUND

1. Field

The disclosure relates to a structure for enhancing radiated spurious emission (RSE) in a foldable electronic device in a folded state, and a control method therefor.

2. Description of Related Art

Electronic devices, such as smartphones include various functions for fulfilling users' needs. In addition, there is an increasing need for a large screen to allow a user to more easily view or use various contents, such as moving images, videos, television, game programs, in electronic devices.

In order to fulfil such users' needs, an effort to provide a large screen without increasing a real size of an electronic device is ongoing. For example, a foldable structure which can change a size of a display by folding or unfolding an electronic device has been developed.

The above information is presented as background information only to assist with an understanding of the disclosure. No determination has been made, and no assertion is made, as to whether any of the above might be applicable as prior art with regard to the disclosure.

SUMMARY

An electronic device having a foldable structure (hereinafter, referred to as an "electronic device") may have antennas disposed in a part and/or all of structures that are separated by at least one hinge according to the foldable structure. Accordingly, when the electronic device is folded, the antennas disposed in the structures may overlap to face each other. When the antennas overlap each other, a wireless signal emitted from one antenna of the overlapping antennas may interfere with the other antenna. Such a phenomenon may increase a possibility that radiated spurious emission (RSE) occurs due to degradation of antenna performance and ineffective frequency amplification when the overlapping antennas use the same frequency band.

Aspects of the disclosure are to address at least the above-mentioned problems and/or disadvantages and to provide at least the advantages described below. Accordingly, an aspect of the disclosure is to provide a foldable structure which has a plurality of antenna elements disposed therein, considering performance of transmission/reception of a wireless signal, and an operating method therefor.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first housing structure, a second housing structure, and a hinge structure connecting the first housing structure and the second housing structure, the housing forming a rear surface and a side surface of the electronic device when the electronic device is in an open state, a display seen through a portion of the housing, at least one first antenna formed by using at least a portion of the first housing structure, at least one second antenna formed by using at least a portion of the second housing structure, and at least one processor, and at least a portion of the first housing structure is formed with a metallic material to form the at least one first antenna, and at least another portion of the first housing structure is formed with a nonmetallic material to form a segment to isolate the at least one first antenna, at least a portion of the second housing structure is formed with a metallic material to form the at least one second antenna, and at least another portion of the second housing structure is formed with a nonmetallic material to form a segment to isolate the at least one second antenna, and the at least one processor is configured to control an on or off state of a second low noise amplifier, based on at least one of a wireless communication method used by the electronic device, whether the electronic device is in a close state, whether a wireless signal is transmitted through the at least one first antenna, and a strength of a wireless signal received through the at least one first antenna.

In accordance with another aspect of the disclosure, an operating method of an electronic device is provided. The operating method includes at least one first antenna configured to transmit and receive a wireless signal, and at least one second antenna configured to receive a wireless signal, includes a first determination operation of determining whether the electronic device is in a close state or an open state, a second determination operation of determining whether a wireless communication method used by the electronic device is based on time division duplexing (TDD) or frequency division duplexing (FDD), a third determination operation of determining whether a wireless signal is transmitted through the at least one first antenna, a fourth determination operation of determining whether a strength of a wireless signal received through the at least one first antenna is greater than or equal to a pre-set value, and an operation of controlling an on or off state of the at least one second antenna, based on a result of at least one determination operation of the first determination operation, the second determination operation, the third determination operation, and the fourth determination operation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numerals are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
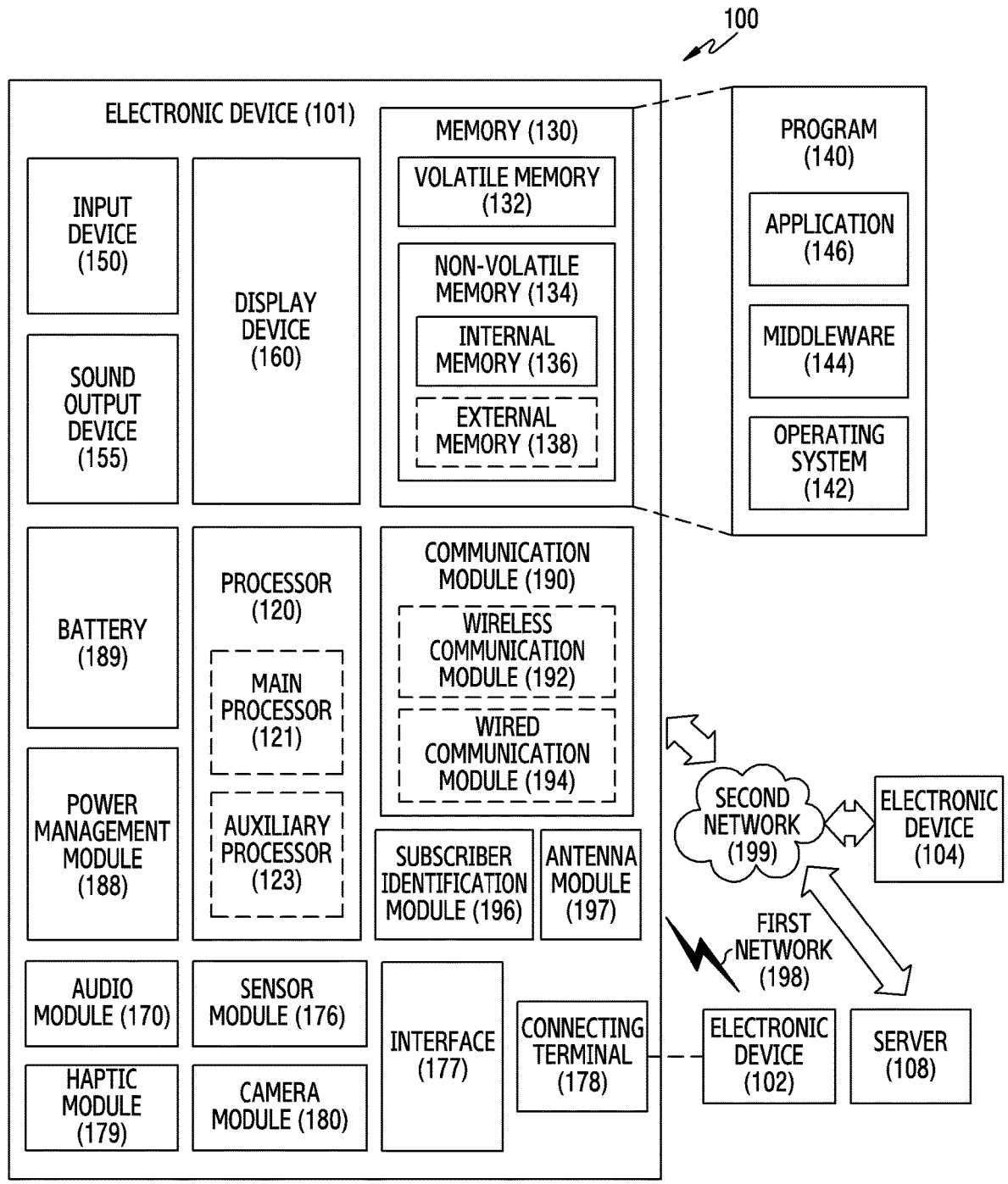
FIG. 1 is a view illustrating a block configuration of an electronic device in a network environment according to an embodiment of the disclosure.

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. Alternatively, at least one of the components (e.g., the display device 160 or the camera module 180) may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 includes a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software (e.g., the program 140) and input data or output data for a command related thereto. The memory 130 includes the volatile memory 132 and the non-volatile memory 134.

The program 140 may be stored in the memory 130 as software, and includes, for example, an operating system (OS) 142, middleware 144, or an application 146.

The input device 150 may receive a command or data to be used by another component of the electronic device 101 (e.g., the processor 120), from the outside (e.g., a user) of the electronic device 101. The input device 150 may include a microphone, a mouse, a keyboard, and/or a digital pen (e.g., a stylus pen).

The sound output device 155 may output sound signals to the outside of the electronic device 101. The sound output device 155 may include a speaker or a receiver. The speaker may be used for general purposes, such as playing multimedia or playing record, and the receiver may be used for incoming calls. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture an image or moving images. The camera module 180 may include one or more lenses, image sensors, ISPs, or flashes.

The power management module 188 may manage power supplied to the electronic device 101. The power management module 188 may be implemented as at least part of a power management IC (PMIC).

The battery 189 may supply power to at least one component of the electronic device 101. The battery 189 may include a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency IC (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device may be one of various types of electronic devices. An electronic device may include a portable communication device (e.g., a smartphone), a computer device, a portable multimedia device, a portable medical device, a camera, a wearable device, or a home appliance. However, the electronic devices are not limited to the examples described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific IC (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

According to various embodiments of the disclosure, the processor 120 may establish and manage a communication session between the electronic device 101 and a network, and may control a function for maintaining persistent communication based on a movement of the electronic device 101. According to an embodiment of the disclosure, the processor 120 may acquire a Tracking Area Identifier (TAI) list during an attach procedure or a Tracking Area Update (TAU) procedure. The TAI list may include an identifier of at least one tracking area managed by a corresponding Mobility Management Entity (MME). For example, when tracking areas managed by the MME are a first tracking area and a second tracking area, the TAI list may include an identifier of the first tracking area and an identifier of the second tracking area. The identifier of the tracking area may consist of a Public Land Mobile Network Identifier (PLMN ID) and/or a Tracking Area Code (TAC). For example, the processor 120 may transmit an attach request message for a network attach through the communication module 190, and may receive an attach accept message including the TAI list in response to the attach request message transmission. For another example, the processor 120 may transmit a TAU request message when there is a change in a tracking area in which the electronic device 101 is located or there is a change in a Radio Access Technology (RAT), and in response thereto, may receive a TAU accept message including the TAI list. According to an embodiment of the disclosure, the processor 120 may store the acquired TAI list in the memory 130.

According to various embodiments of the disclosure, the processor 120 may transmit the attach request message and/or the TAU request message, and may determine whether an attach failure and/or a TAU failure occurs. For example, when an attach is rejected or a TAU is rejected due to a weak electronic field situation or an unspecified cause, the processor 120 may recognize an occurrence of an attach failure caused by a low layer failure or a TAU failure caused by the low layer failure. For another example, when a response message for the attach request is not received within a specified first time duration from a timing at which the attach request message is transmitted, the processor 120 may determine that the attach has failed. The response message for the attach request may include at least one of an attach accept message and an attach reject message. The specified first time duration may be, for example, a time duration in which a T3410 timer runs. For another example, when the response message for the TAU request is not received within the specified second time duration from a timing at which the TAU request message is transmitted, the processor 120 may recognize that the TAU has failed. The response message for the TAU request may include at least one of a TAU accept message and a TAU reject message. The specified second time duration may be, for example, a time duration in which a T3430 timer runs.

According to various embodiments of the disclosure, upon the occurrence of the attach failure and/or the TAU failure, the processor 120 may run the specified first timer (e.g., T3411). The first timer may be a timer for measuring a waiting timer for retransmission of the attach request message or retransmission of the TAU request message. For example, when the first timer expires, the processor 120 may retransmit the attach request message or the TAU request message. According to an embodiment of the disclosure, the processor 120 may perform cell reselection during the first timer runs. For example, the processor 120 may perform cell reselection for moving from a first cell in which the attach or the TAU is attempted on a neighboring second cell. Herein, as defined in the standard specification, the cell reselection may include not only a cell reselection operation of the electronic device 101 in an idle state after a network attach but also an operation in which the electronic device 101 that has lost a connection of the network camps on another cell.

According to an embodiment of the disclosure, when channel quality of the second cell is better than channel quality of the first cell, the processor 120 may allow cell reselection to be performed on the second cell through the communication module 190. According to an embodiment of the disclosure, irrespective of the channel quality of the first cell and the channel quality of the second cell, the processor 120 may forcibly bar the use of the first cell and may allow cell reselection to be performed on the second cell through the communication module 190. For example, even if the channel quality of the first cell is better than the channel quality of the second cell, the processor 120 may control the communication module 190 to perform cell reselection on the second cell relatively more adjacent than the first cell. According to an embodiment of the disclosure, the use of the first call may be forcibly barred during the first timer runs, and the barring on the first cell may be released when the first timer expires, thereby returning to the first cell on the basis of channel quality.

According to various embodiments of the disclosure, the processor 120 may determine whether a tracking area of the reselected second cell is included in the TAI list stored in the memory 130. For example, the processor 120 may compare a TAI of the reselected second cell and a TAI included in the TAI list stored in the memory 130 to determine whether the tracking area of the reselected second cell is included in the TAI list. According to an embodiment of the disclosure, if the tracking area of the reselected second cell is not included in the TAI list stored in the memory 130, the processor 120 may forcibly expire the first timer, and may transmit an attach request message or a TAU request message to a base station of the second cell. According to an embodiment of the disclosure, if the tracking area of the reselected second cell is included in the TAI list stored in the memory 130, the processor 120 may determine whether the first timer forcibly expires on the basis of the channel quality of the reselected second cell. For example, if received signal strength of the reselected second cell is greater than a threshold, the processor 120 may forcibly expire the first timer, and may transmit the attach request message or the TAU request message to the base station of the reselected second cell. For another example, if the received signal strength of the reselected second cell is less than or equal to the threshold, the processor 120 may wait until the first timer expires, and after the first timer expires, may transmit the attach request message or the TAU request message to the base station of the reselected second cell. According to an embodiment of the disclosure, if the tracking area of the reselected second cell is included in the TAI list stored in the memory 130, the processor 120 may forcibly expire the first timer irrespective of channel quality of the reselected second cell, and may retransmit the attach request message or the TAU request message. According to an embodiment of the disclosure, if the tracking area of the reselected second cell is not included in the TAI list stored in the memory 130, the processor 120 may transmit a service request message to the base station of the reselected second cell. For example, if the TAI of the reselected cell is included in the TAI list stored in the memory 130 in a situation where the first timer runs due to a TAU failure, the processor 120 may determine that there is no need to perform a TAU procedure. If it is determined that there is no need to perform the TAU procedure, the processor 120 may omit the operation of transmitting the TAU request message and may transmit the service request message.

An electronic device (e.g., the electronic device 101 shown in FIG. 1) according to an embodiment may include a communication module (e.g., the communication module 190 shown in FIG. 1), at least one processor (e.g., the processor 120 shown in FIG. 1), and a memory (e.g., the memory 130 shown in FIG. 1) operatively coupled with the at least one processor to store a Tracking Area Identifier (TAI) list, wherein the memory comprises instructions, when executed, causing the at least one processor to: run a specified first timer upon detecting an attach failure or a Tracking Area Update (TAU) failure in a first cell, perform cell reselection on a second cell during the first timer runs, determine whether a TAI of the second cell is comprised in the TAI list, and if the TAI of the second cell is comprised in the TAI list, forcibly expire the first timer, and transmit an attach request message or a TAU message through the communication module.

According to an embodiment of the disclosure, the instructions cause the at least one processor to: if the TAI of the second cell is comprised in the TAI list, determine whether channel quality of the second cell satisfies a specified condition, and if the channel quality of the second cell satisfies the specified condition, expire the first timer, and transmit the attach request message or the TAU message through the communication module.

According to an embodiment of the disclosure, the instructions cause the at least one processor to: if the channel quality of the second cell does not satisfy the specified condition, wait until the first timer expires, and if the first timer expires, transmit the attach request message or the TAU message through the communication module.

According to an embodiment of the disclosure, the instructions cause the at least one processor to, if the TAI of the second cell is comprised in the TAI list, stop the first timer, and transmit a service request message through the communication module.

According to an embodiment of the disclosure, the instructions cause the at least one processor to bar the use of the first cell, and control the communication module to perform cell reselection on the second cell, during the first timer runs.

According to an embodiment of the disclosure, the instructions cause the at least one processor to transmit an attach request message in the first cell, detect whether the attach failure occurs due to a low layer failure after the attach request message is transmitted, and run the first timer upon detecting the attach failure due to the low layer failure.

According to an embodiment of the disclosure, the instructions cause the at least one processor to transmit an attach request message in the first cell, determine whether a response for the attach request message is received during a specified time duration from a timing at which the attach request message is transmitted, and if the response for the attach request message is not received during the specific time duration, detect the attach failure, and run the first timer.

According to an embodiment of the disclosure, the instructions cause the at least one processor to transmit a TAU request message in the first cell, determine whether the TAU failure caused by the low layer failure is detected after the TAU request message is transmitted, and run the first timer upon detecting the TAU failure.

According to an embodiment of the disclosure, the instructions cause the at least one processor to transmit a TAU request message in the first cell, determine whether the response for the TAU request message is received during a specified time duration from a timing at which the TAU request message is transmitted, and if the response for the TAU request message is not received during the specific time duration, detect the TAU failure, and run the first timer.

According to an embodiment of the disclosure, the TAI list is acquired through at least one of a previously received attach accept message and a TAU accept message.

Figure 2:
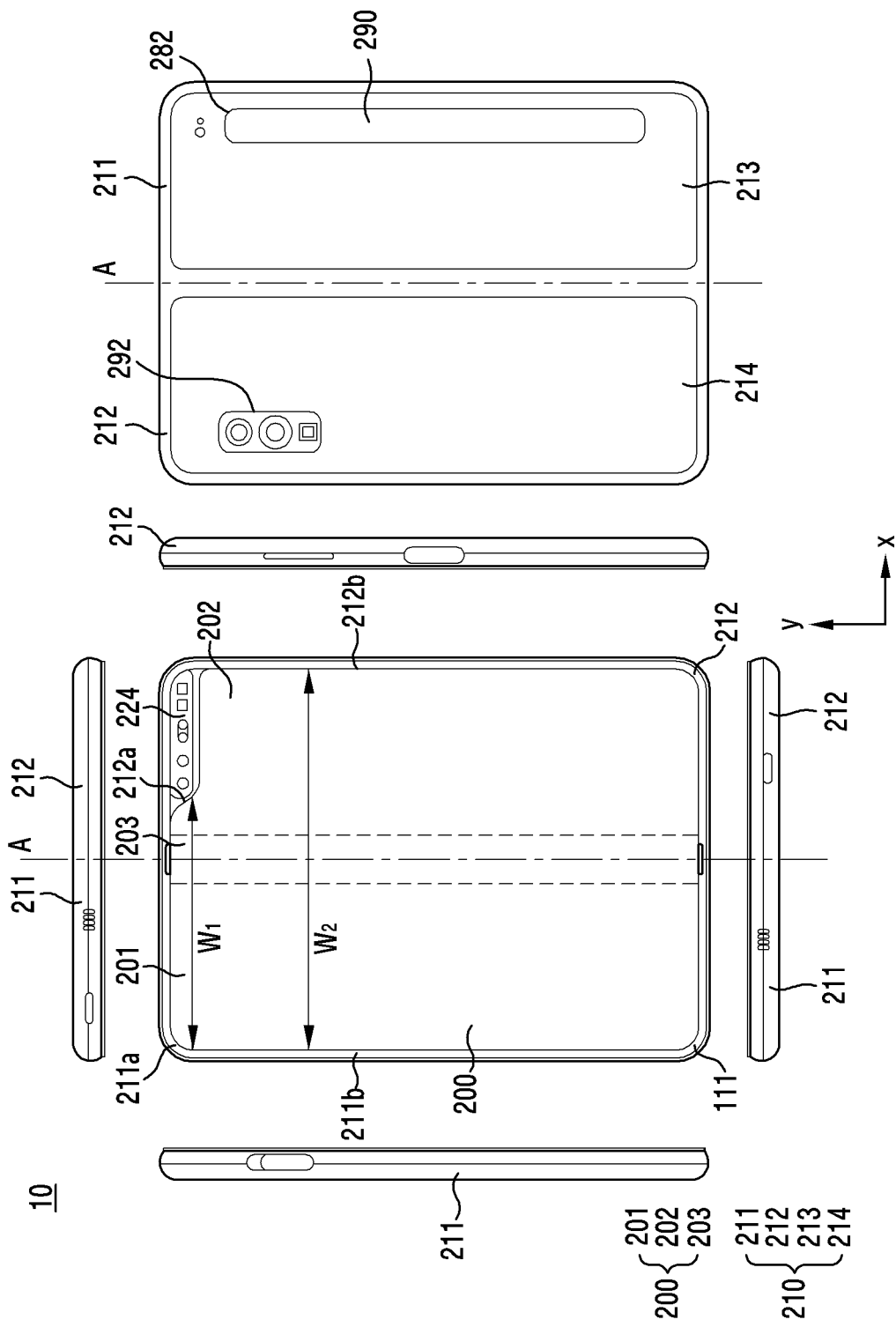
FIG. 2 is a view illustrating a flat state of a foldable electronic device according to an embodiment of the disclosure.

FIG. 2 is a view illustrating a flat state of an electronic device according to an embodiment of the disclosure.

Figure 3:
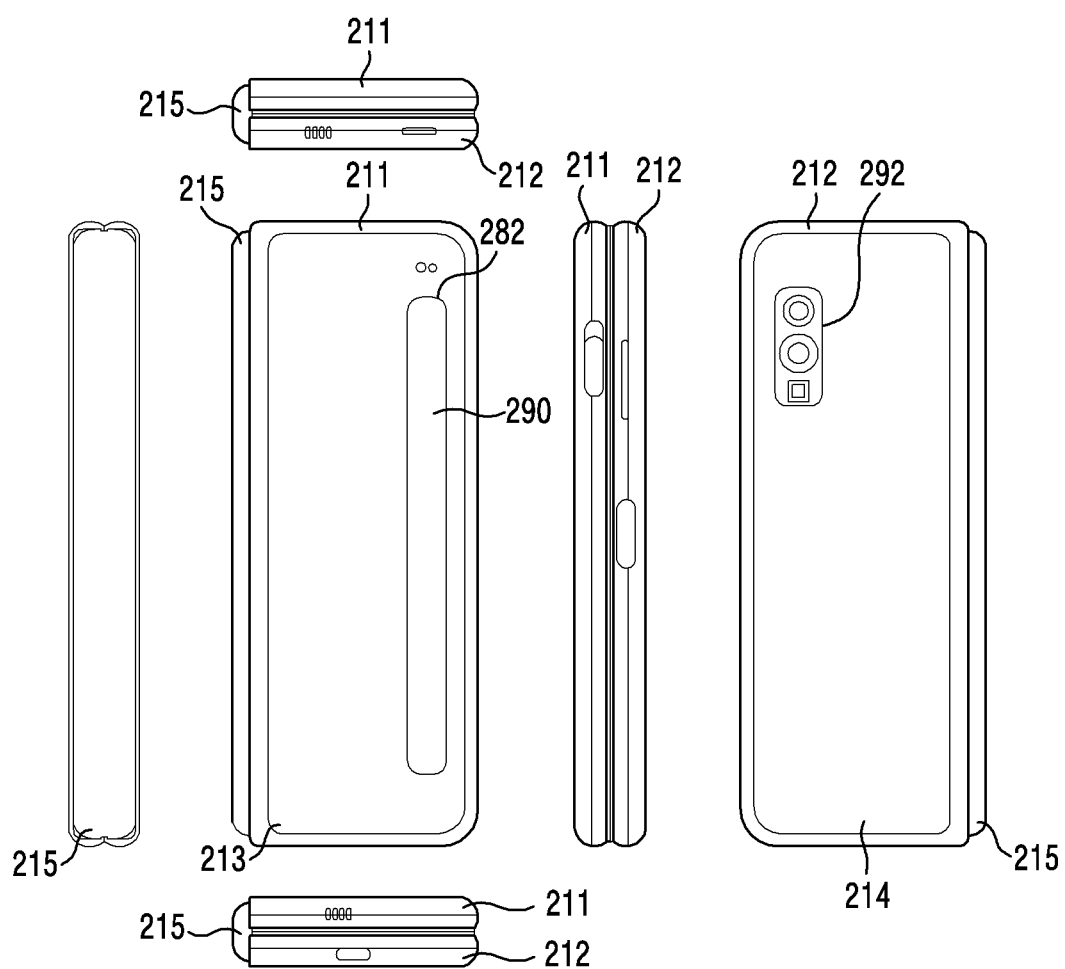
FIG. 3 is a view illustrating a folded state of a foldable electronic device according to an embodiment of the disclosure.

FIG. 3 is a view illustrating a folded state of an electronic device according to an embodiment of the disclosure.

Referring to FIGS. 2 and 3, an electronic device 10 (for example, the electronic device 10 of FIG. 1) according to an embodiment may include a foldable housing 210, a hinge cover 215, and a display 200. For example, the hinge cover 215 may cover a foldable portion of the foldable housing 210. For example, the display 200 may be a flexible or foldable display which is disposed in a space formed by the foldable housing 210. In the disclosure, a surface on which the display 200 is disposed is defined as a first surface or a front surface of the electronic device 10. In addition, the opposite surface of the front surface is defined as a second surface or a rear surface of the electronic device 10. In addition, a surface that surrounds a space between the front surface and the rear surface is defined as a third surface or a side surface of the electronic device 10.

According to an embodiment of the disclosure, the foldable housing 210 may include a first housing structure 211, a second housing structure 212, a first rear surface cover 213, and a second rear surface cover 214. The second housing structure 212 may include, for example, a sensor area 224. The foldable housing 210 is not limited to the shape and coupling shown in FIGS. 2 and 3, and may be implemented in other shapes or a combination and/or coupling of components. For example, the first housing structure 211 may be integrally formed with the first rear surface cover 213, and the second housing structure 212 may be integrally formed with the second rear surface cover 214.

According to an embodiment of the disclosure, the first housing structure 211 and the second housing structure 212 may be disposed on both sides with reference to a folding axis (A axis). The first housing structure 211 and the second housing structure 212 may have a substantially symmetric shape with respect to the folding axis A. The first housing structure 211 and the second housing structure 212 may have an angle or a distance formed therebetween and changed according to whether the electronic device 10 is in a flat state, a folded state, or an intermediate state. The second housing structure 212 may include the sensor area 224 having various sensors disposed therein, unlike the first housing structure 211. However, the other area may have a symmetric shape.

According to an embodiment of the disclosure, the first housing structure 211 and the second housing 212 may form a recess to accommodate the display 200. The recess may have two or more different widths in a direction perpendicular to the folding axis A due to the presence of the sensor area 224.

According to an embodiment of the disclosure, the recess may include a first width w1 and a second width w2. For example, the first width w1 may indicate a distance between a first portion 211a of the first housing structure 211 that is parallel to the folding axis A, and a first portion 212a of the second housing structure 212 that is formed on an edge of the sensor area 224. The second width w2 may indicate, for example, a distance between a second portion 211b of the first housing 211 and a second portion 212b of the second housing structure 212 that does not correspond to the sensor area 224 and is parallel to the folding axis A. In this case, the second width w2 may be formed longer than the first width w1. In other words, the first portion 211a of the first housing structure 211 and the first portion 212a of the second housing structure 212 that have a mutually asymmetric shape may form the first width w1 of the recess. The second portion 211b of the first housing structure 211 and the second portion 212b of the second housing structure 212 which have a mutually symmetric shape may form the second width w2 of the recess.

According to an embodiment of the disclosure, a distance from the folding axis A to the first portion 212a of the second housing structure 212 may be different from a distance from the folding axis A to the second portion 212b of the second housing structure 212. The widths of the recess are not limited to the illustrated example. In various embodiments of the disclosure, the recess may have a plurality of widths according to a shape of the sensor area 224 or portions of the first housing structure 211 and the second housing 212 that have an asymmetric shape.

In an embodiment of the disclosure, at least a portion of the first housing structure 211 and the second housing structure 212 may be formed with a metallic material or a nonmetallic material which has rigidity of a level selected to support the display 200.

In an embodiment of the disclosure, the sensor area 224 may be formed to have a predetermined area adjacent to one corner of the second housing structure 212. However, the disposal, shape, and size of the sensor area 224 are not limited to the illustrated example. For example, the sensor area 224 may be disposed on another corner of the second housing structure 212 or on a certain area between an upper corner and a lower corner.

In an embodiment of the disclosure, components embedded in the electronic device 10 to perform various functions may be exposed to the front surface of the electronic device 10 through the sensor area 224 or one or more openings formed on the sensor area 224. The components may include, for example, at least one of a front-facing camera, a receiver, or various kinds of sensors, such as a proximity sensor.

According to an embodiment of the disclosure, the first rear surface cover 213 may be disposed on the rear surface of the electronic device 10 on one side of the folding axis. The first front rear surface cover 213 may have, for example, a substantially rectangular periphery. The first rear surface cover 213 may have its periphery covered by the first housing structure 211. Similarly, the second rear surface cover 214 may be on the rear surface of the electronic device 10 on the other side of the folding axis. The second rear surface cover 214 may have its periphery covered by the second housing structure 212.

In the illustrated embodiment of the disclosure, the first rear surface cover 213 and the second rear surface cover 214 may have a substantially symmetric shape with reference to the folding axis (A axis). The electronic device 10 may include the first rear surface cover 213 and the second rear surface cover 214 that have various shapes other than the mutually symmetric shape. For example, the first rear surface cover 213 may be integrally formed with the first housing structure 211, and the second rear surface cover 214 may be integrally formed with the second housing structure 212.

In an embodiment of the disclosure, the first rear surface cover 213, the second rear surface cover 214, the first housing structure 211, and the second housing structure 212 may form a space to have various components (for example, a printed circuit board or a battery) of the electronic device 10 disposed therein. One or more components may be disposed on the rear surface of the electronic device 10 or may be visually exposed therethrough. For example, at least a portion of a sub display 290 may be visually exposed through a first rear surface area 282 of the first rear surface cover 213. In another example, one or more components or sensors may be visually exposed through a second rear surface area 292 of the second rear surface cover 214. The sensors may include a proximity sensor and/or a rear-facing camera.

Referring to FIG. 3, the hinge cover 215 according to an embodiment may be disposed between the first housing structure 211 and the second housing structure 212. The hinge cover 215 may be configured to hide an inner component (for example, a hinge structure). The hinge cover 215 may be hidden by a portion of the first housing structure 211 and the second housing structure 212 or may be exposed to the outside according to a state (for example, a flat state or a folded state) of the electronic device 10.

For example, when the electronic device 10 is in the flat state as shown in FIG. 2, the hinge cover 215 may be hidden by the first housing structure 211 and the second housing structure 212 and may not be exposed. For example, when the electronic device 10 is in the folded state (for example, a fully folded state) as shown in FIG. 3, the hinge cover 215 may be exposed to the outside between the first housing structure 211 and the second housing structure 212. For example, when the electronic device 10 is in an intermediate state in which the first housing structure 211 and the second housing structure 212 are folded with a certain angle, the hinge cover 215 may be exposed to the outside between the first housing structure 211 and the second housing structure 212 at least in part. However, in this case, an exposed area may be smaller than that in the fully folded state. In this case, the hinge cover 215 may include a curved surface.

According to an embodiment of the disclosure, the display 200 may be disposed on a space formed by the foldable housing 210. For example, the display 200 may be seated on the recess formed by the foldable housing 210. The display 200 may occupy most of the front surface of the electronic device 10. In this case, the front surface of the electronic device 10 may include the display 20 and some areas of the first housing structure 211 and some areas of the second housing 212 that are adjacent to the display 200. In addition, the rear surface of the electronic device 10 may include the first rear surface cover 213, some areas of the first housing structure 211 that are adjacent to the first rear surface cover 213, the second rear surface cover 214, and some areas of the second housing structure 212 that are adjacent to the second rear surface cover 214.

According to an embodiment of the disclosure, at least some areas of the display 200 may be deformed into a flat surface or a curved surface. The display 200 may include, for example, a folding area 203, a first area 201 disposed on one side (for example, the left side of the folding area 203 shown in FIG. 2) with reference to the folding area 203, and a second area 202 disposed on the other side (for example, the right side of the folding area 203 shown in FIG. 2).

Dividing the display 200 into areas in FIG. 3 is merely an example. The display 200 may be divided into a plurality of areas (for example, four or more or two areas) according to a structure or a function. For example, the display 200 may be divided into areas by the folding area 203 which is extended in parallel with the y axis or the folding axis (A axis). In another example, the display 200 may be divided into areas with reference to another folding area (for example, a folding area parallel to the x axis) or another folding axis (for example, a folding axis parallel to the x axis).

According to an embodiment of the disclosure, the first area 201 may be substantially symmetrical to the second area 202 with reference to the folding area 203. However, the second area 202 may include a notch that is cut according to the presence of the sensor area 224, unlike the first area 201. However, on the other portion, the second area 202 may have a symmetrical shape with the first area 201. In other words, the first area 201 and the second area 202 may include portions that are symmetrical to each other and portions that are asymmetrical to each other.

Hereinafter, operations of the first housing structure 211 and the second housing structure 212 and respective areas of the display 200 according to a state (for example, a flat state and a folded state) of the electronic device 10 will be described.

In an embodiment of the disclosure, when the electronic device 10 is in the flat state (for example, FIG. 2), the first housing structure 211 may form an angle of 180 degrees with the second housing structure 212, and may be disposed to face in the same direction. In this case, a surface of the first area 201 of the display 200 may form the angle of 180 degrees with a surface of the second area 202, and may face in the same direction (for example, a front facing direction of the electronic device). In this case, the folding area 203 may be coplanar with the first area 201 and the second area 202.

In an embodiment of the disclosure, when the electronic device 10 is in the folded state (for example, FIG. 3), the first housing structure 211 and the second housing structure 212 may be disposed to face each other. In this case, the surface of the first area 201 of the display 200 and the surface of the second area 202 may face each other with a small angle (for example, between 0 degree and 10 degrees) being formed therebetween. In this case, at least a portion of the folding area 203 may be formed with a curved surface having a predetermined curvature.

In an embodiment of the disclosure, when the electronic device 10 is in an intermediate state, the first housing structure 211 may be disposed with a certain angle with the second housing structure 212. In this case, the surface of the first area 201 of the display 200 and the surface of the second area 202 may form an angle that is larger than in the folded state and is smaller than in the flat state. In this case, at least a portion of the folding area 203 may be formed with a curved surface having a predetermined curvature. In this case, the curvature may be smaller than that in the folded state.

Figure 4:
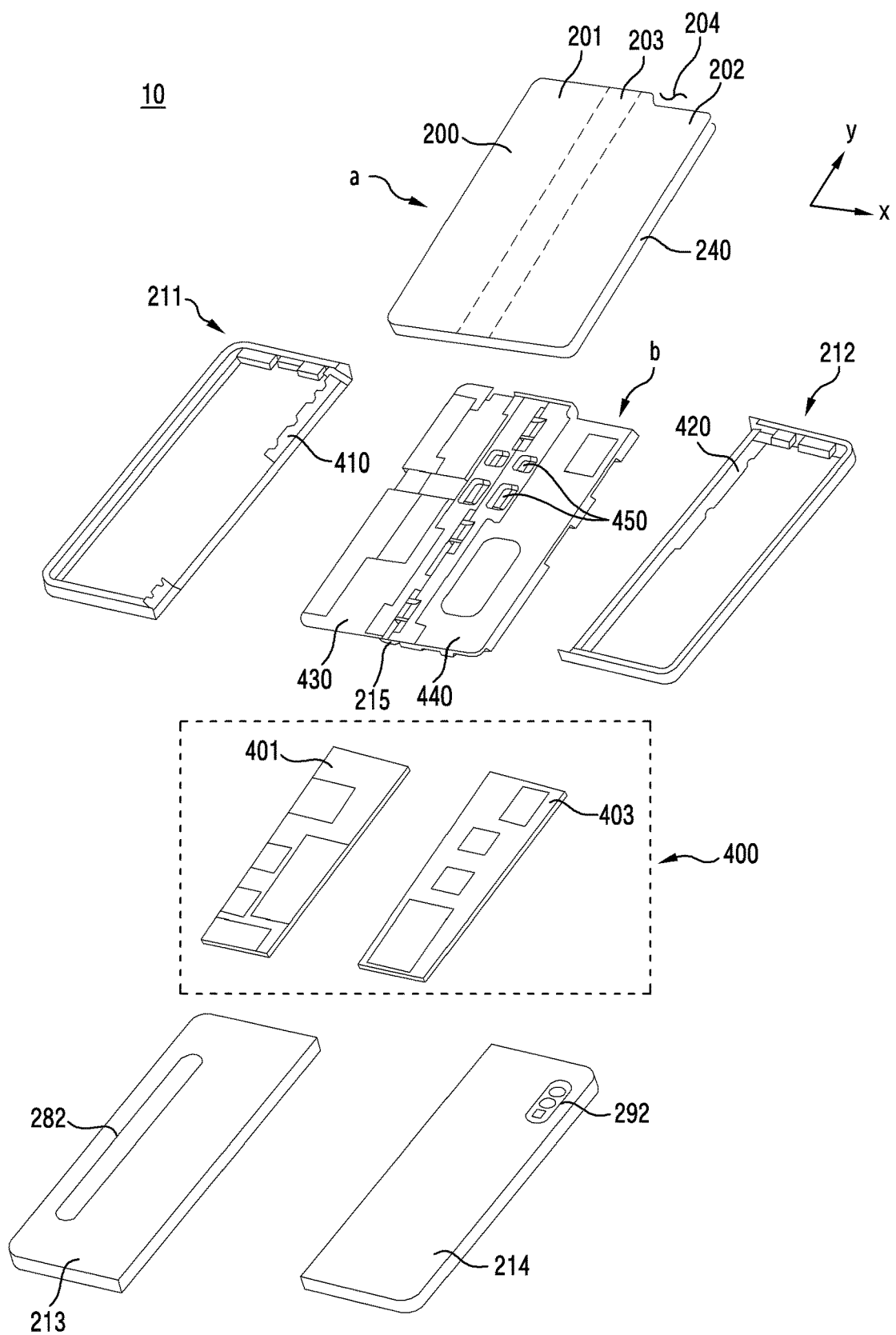
FIG. 4 is an exploded perspective view of a foldable electronic device according to an embodiment of the disclosure.

FIG. 4 is an exploded perspective view of an electronic device according to an embodiment of the disclosure.

Referring to FIG. 4, the electronic device 10 according to an embodiment may include a display unit a, a bracket assembly b, a substrate unit 400, the first housing structure 211, the second housing structure 212, the first rear surface cover 213, and the second rear surface cover 214. In the disclosure, the display unit a may be referred to as a display module or a display assembly.

According to an embodiment of the disclosure, the display unit a may include the display 200 and one or more plates or layers 240 on which the display 200 is seated. The plate 240 may be disposed between the display 200 and the bracket assembly b. The display 200 may be disposed on at least a portion of one surface (for example, an upper surface of FIG. 4) of the plate 240. The plate 240 may be formed in a shape corresponding to the display 200. Some areas of the plate 240 may be formed in a shape corresponding to a notch 204 of the display 200.

According to an embodiment of the disclosure, the bracket assembly b may include a first bracket 430, a second bracket 440, a hinge structure disposed between the first bracket 430 and the second bracket 440, the hinge cover 215 which covers the hinge structure when it is viewed from the outside, and a wire member 450 (for example, a flexible printed circuit (FPC)) which is disposed across the first bracket 430 and the second bracket 440.

In an embodiment of the disclosure, the bracket assembly b may be disposed between the plate 240 and the substrate unit 400. The first bracket 430 may be disposed between the first area 201 of the display 200 and a first substrate 401. The second bracket 440 may be disposed between the second area 202 of the display 200 and a second substrate 403.

In an embodiment of the disclosure, at least portions of the wire member 450 and the hinge structure may be disposed inside the bracket assembly b. The wire member 450 may be disposed in a direction that crosses over the first bracket 430 and the second bracket 440 (for example, the x axis direction). For example, the wire member 450 may be disposed in a direction (for example, the x axis direction) perpendicular to the folding axis (for example, the y axis or the folding axis A of FIG. 1) of the folding area 203.

According to an embodiment of the disclosure, the substrate unit 400 may include the first substrate 401 disposed at the side of the first bracket 430, and the second substrate 403 disposed at the side of the second bracket 440. The first substrate 401 and the second substrate 403 may be disposed in a space that is formed by the bracket assembly b, the first housing structure 211, the second housing structure 212, the first rear surface cover 213, and the second rear surface cover 214. Components for implementing various functions of the electronic device 10 may be mounted on the first substrate 401 and the second substrate 403.

According to an embodiment of the disclosure, the first housing structure 211 and the second housing structure 212 may be assembled with each other to be coupled to both sides of the bracket assembly b with the display unit a being coupled with the bracket assembly b. The first housing structure 211 and the second housing structure 212 may slide to both sides of the bracket assembly b and may be coupled with the bracket assembly b.

In an embodiment of the disclosure, the first housing structure 211 may include a first rotation support surface 410, and the second housing structure 212 may include a second rotation support surface 420 corresponding to the first rotation support surface 410. The first rotation support surface 410 and the second rotation support surface 420 may include curved surfaces corresponding to curved surfaces included in the hinge cover 215.

In an embodiment of the disclosure, when the electronic device 10 is in the flat state (for example, the electronic device of FIG. 2), the first rotation support surface 410 and the second rotation support surface 420 may cover the hinge cover 215, such that the hinge cover 215 is not exposed to the rear surface of the electronic device 10 or is exposed to a minimum. When the electronic device 10 is in the folded state (for example, the electronic device of FIG. 3), the first rotation support surface 410 and the second rotation support surface 420 may rotate along the curved surfaces included in the hinge cover 215, such that the hinge cover 215 is exposed to the rear surface of the electronic device 10 to the maximum.

Figure 5A:
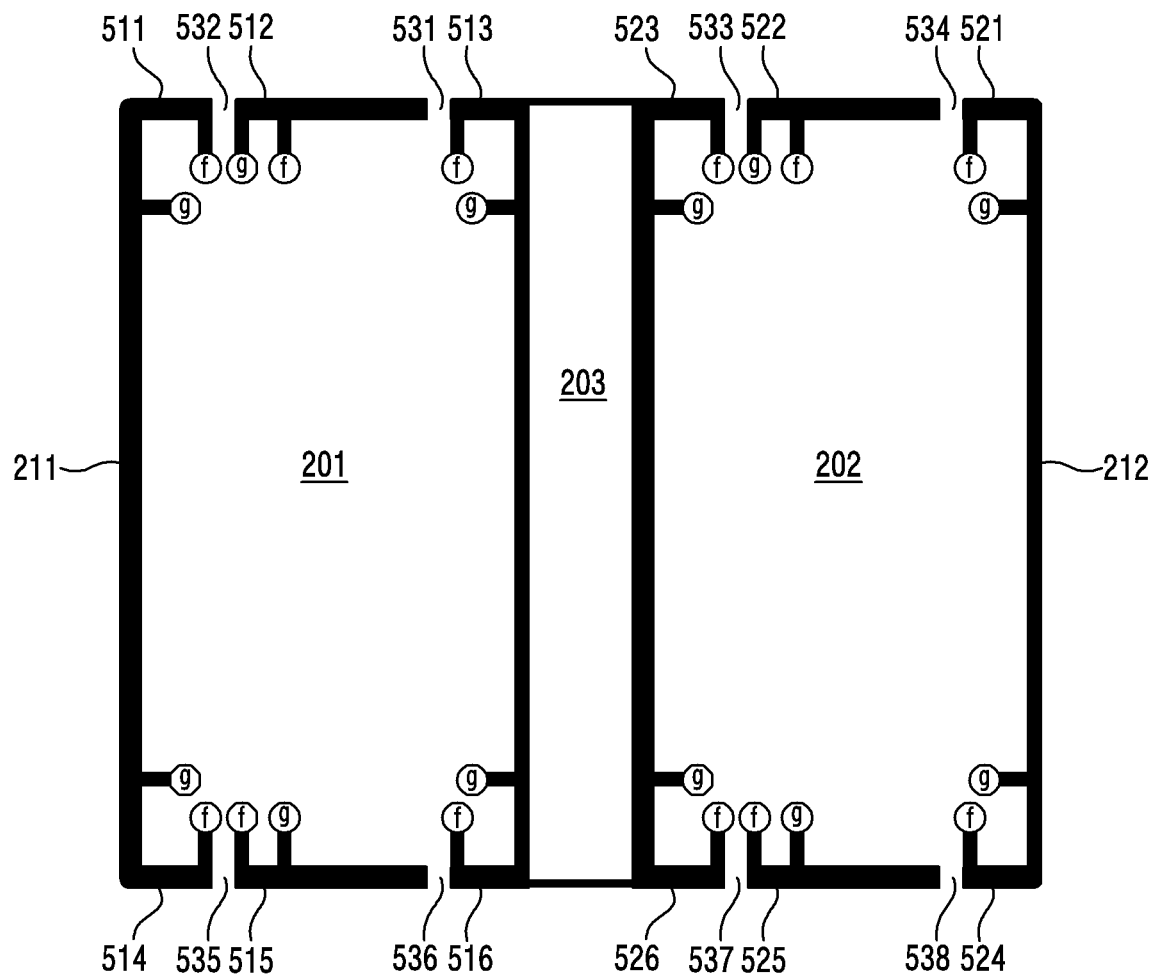
FIG. 5A is a view illustrating an arrangement structure of antennas in a foldable electronic device according to an embodiment of the disclosure.
Figure 5B:
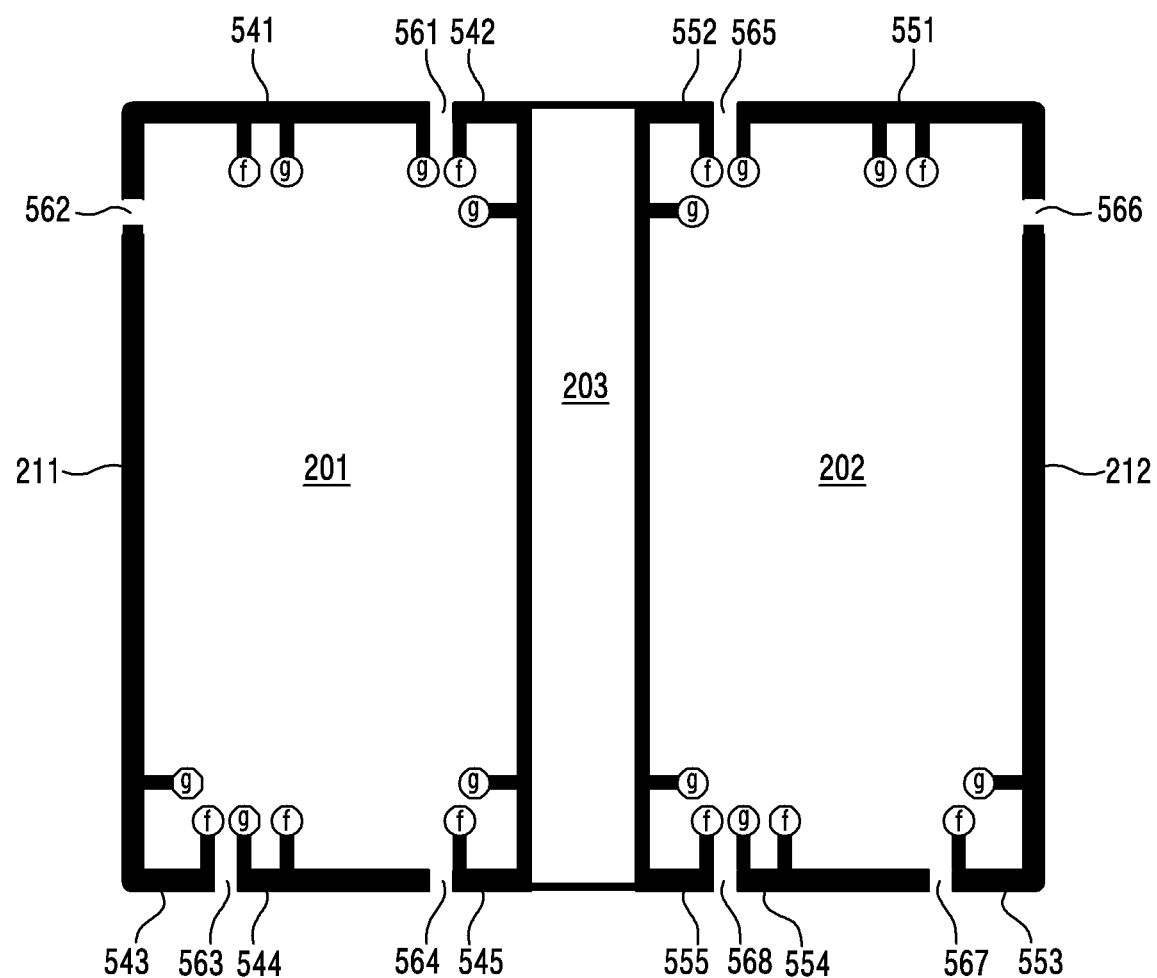
FIG. 5B is a view illustrating an arrangement structure of antennas in a foldable electronic device according to an embodiment of the disclosure.
Figure 5C:
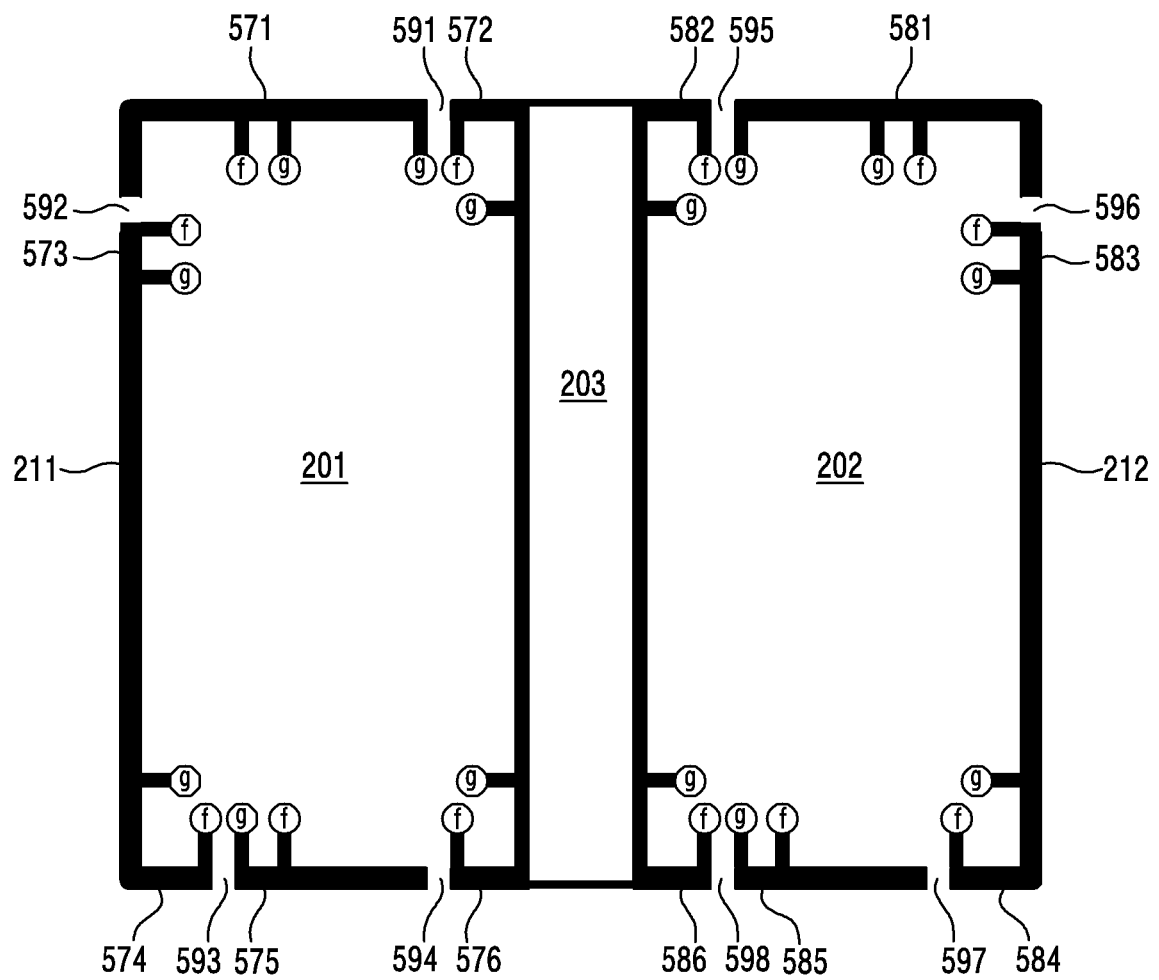
FIG. 5C is a view illustrating an arrangement structure of antennas in a foldable electronic device according to an embodiment of the disclosure.

FIGS. 5A, 5B and 5C are views illustrating a structure in which a plurality of antennas are arranged in an electronic device according to various embodiments of the disclosure.

Referring to FIGS. 5A, 5B, and 5C, the electronic device 10 according to various embodiments may have antennas arranged in the second area 202 or the second housing structure 212, as well as in the first area 201 or the first housing structure 211. In addition, as shown in FIGS. 5A, 5B, and 5C, a flexible radio frequency (RF) cable (FRC) is suggested in the electronic device 10 to connect a circuit of the first area 201 and an antenna of the second area 202 or the second housing structure 212. The FRC may be provided in the form of a flexible PCB (FPCB) or a coaxial cable.

Referring to FIG. 5A, the electronic device 10 according to an embodiment may configure a first antenna group by using the first area 201 and/or the first housing structure 211.

The first antenna group may include, for example, six first antennas 511 to 516. The electronic device 10 may configure a second antenna group by using the second area 202 and/or the second housing structure 212. The second antenna group may include, for example, six second antennas 521 to 526. Positions of the first antennas 511 to 516 may correspond to positions of the second antennas 521 to 526 (for example, positions where the first antennas and the second antennas meet each other in the folded state), but this should not be considered as limiting.

According to various embodiments of the disclosure, at least portions of the first housing structure 211 and the second housing structure 212 may be formed with a metallic material which is an electric conductor of a selected size or a nonmetallic material which is a nonconductor. For example, portions (for example, a portion between a feeding portion (f) and a ground portion (g)) constituting the first and second antennas 511 to 516, 521 to 526 may be formed with a metallic material to emit an RF signal. To prevent interference between the first and second antennas 511 to 516, 521 to 526, first segments 531, 532, 535, 536 of the first housing structure 211 and second segments 533, 534, 537, 538 of the second housing structure 212 may be formed with a nonmetallic material. The first and second segments 531 to 538 formed with the nonmetallic material may cause signals not to be transmitted between the first and second antennas 511 to 516, 521 to 526.

Referring to FIG. 5B, the electronic device 10 according to an embodiment may include five first antennas 541 to 545 by using the first area 201 and/or the first housing structure 211. The electronic device 10 may include five second antennas 551 to 555 by using the second area 202 and/or the second housing structure 212. Positions of the first antennas 541 to 545 may correspond to positions of the second antennas 551 to 555 (for example, positions where the first antennas and the second antennas meet each other in the folded state), but this should not be considered as limiting.

According to various embodiments of the disclosure, at least portions of the first housing structure 211 and the second housing structure 212 may be formed with a metallic material or a nonmetallic material which has rigidity of a selected level. For example, portions (for example, a portion between a feeding portion (f) and a ground portion (g) constituting the first and second antennas 541 to 545, 551 to 555 may be formed with a metallic material to emit an RF signal. To prevent interference between the first and second antennas 541 to 545, 551 to 555, first segments 561, 562, 563, 564 of the first housing structure 211 and second segments 565, 566, 567, 568 of the second housing structure 212 may be formed with a nonmetallic material. The first and second segments 561 to 568 formed with the nonmetallic material may cause signals not to be transmitted between the first and second antennas 541 to 545, 551 to 555. In addition, in order to prevent additional interference, at least portions of the first housing structure 211 and the second housing structure 212 may be connected to the ground.

Referring to FIG. 5C, the electronic device 10 according to an embodiment may include six first antennas 571 to 576 by using the first area 201 and/or the first housing structure 211. The electronic device 10 may include six second antennas 581 to 586 by using the second area 202 and/or the second housing structure 212. Positions of the first antennas 571 to 576 may correspond to positions of the second antennas 581 to 586 (for example, positions where the first antennas and the second antennas meet each other in the folded state), but this should not be considered as limiting.

According to various embodiments of the disclosure, at least portions of the first housing structure 211 and the second housing structure 212 may be formed with a metallic material or a nonmetallic material which has rigidity of a selected level. For example, portions (for example, a portion between a feeding portion (f) and a ground portion (g)) constituting the first and second antennas 571 to 576, 581 to 586 may be formed with a metallic material to emit an RF signal. To prevent interference between the first and second antennas 571 to 576, 581 to 586, first segments 591, 592, 593, 594 of the first housing structure 211 and second segments 595, 596, 597, 598 of the second housing structure 212 may be formed with a nonmetallic material.

In FIGS. 5A, 5B, and 5C, the electronic device 10 according to an embodiment may form the antennas by using the first housing structure 211 and the second housing structure 212. In this case, the positions of the antennas and the positions of the feeding portions and the ground portions for forming the antennas may be one example of a configuration. The number of antennas and the positions of the feeding portions and the ground portions for forming the antennas in the electronic device 10 may be different from those in FIGS. 5A, 5B, and 5C. In addition, the electronic device 10 may include more antennas by forming antennas by using both the first housing structure 211 and the second housing structure 212.

Although FIGS. 5A, 5B, and 5C illustrate that the electronic device 10 according to an embodiment is a horizontal type foldable electronic device that folds along a vertical hinge, antennas may be arranged in a vertical type foldable electronic device that folds along a horizontal hinge in the same or similar way.

According to embodiments of the disclosure, a circuit for transmitting and/or receiving a signal in the antenna arrangement structure illustrated in FIGS. 5A, 5B, and 5C may be provided in the first substrate 401 and/or the second substrate 403.

FIGS. 6A, 6B, 6C, 6D, and 6E are views illustrating a circuit configuration for transmitting and/or receiving a signal in an electronic device according to various embodiments of the disclosure.

Referring to FIGS. 6A, 6B, 6C, 6D, and 6E, the electronic device 10 according to various embodiments may include a communication processor (CP) 610, a transceiver 620, at least one power amplifier (PA) 631, 641, at least one low noise amplifier (LNA) 633, 643, at least one switch 640, 650, and an additional low noise amplifier 635 for a circuit for transmitting and/or receiving a signal.

According to various embodiments of the disclosure, the communication processor 610 may generate a baseband (BB) signal or may receive a BB signal. The communication processor 610 may process a signal according to a corresponding protocol by generating a BB signal based on a used wireless communication method or by receiving a BB signal based on a used wireless communication method.

According to various embodiments of the disclosure, the transceiver 620 may convert the BB signal received from the communication processor 610 into a radio frequency (RF) signal, or may convert a received RF signal into a BB signal. The transceiver 620 may include, for example, a digital-to-analog converter (DAC)/analog-to-digital converter (ADC), a mixer, and/or an oscillator.

According to various embodiments of the disclosure, the power amplifier 631, 641 may amplify a wireless signal to be transmitted, and the low noise amplifier 633, 635, 643 may amplify a received wireless signal, and the first and second switches 640, 650 may connect a transmission path and an antenna 575, 572 when transmitting a signal, and may connect the antenna 575, 572 and a reception path when receiving a signal. The first switch 640 may be, for example, a duplexer. When a signal is transmitted in an FDD method, the duplexer may divide a frequency band of a transmission signal and a frequency band of a reception signal, thereby minimizing interference therebetween.

According to various embodiments of the disclosure, the electronic device 10 may transmit a signal by using one antenna (for example, 575, 651) or two antennas (for example, 575 and 572), and may receive a signal by using two or more antennas (for example, 575, 585 or 575, 572, 581 or 651, 652, 653, 654, 655, 656, 661, 663).

According to an embodiment of the disclosure, the antenna 575 or 651 or 572 may be connected with the power amplifier 631 or 641 or the low noise amplifier 633 or 643 through the switch 640, 650 or the duplexer to transmit or receive a signal. The antenna 575 or 572 or 651 may be positioned on the first substrate 401 provided with a circuit for transmitting and receiving. The first substrate 401 may include the first area 201 or the first housing structure 211.

According to an embodiment of the disclosure, the antenna 585 or 581 or 654 may be connected with the low noise amplifier 633 or 635 or 643. The antenna 585, 654 may be positioned in the second area 202 or the second housing structure 212. The electronic device 10 may use an FRC to deliver a signal which is received through the antenna 585, 581, 654 provided in the second area 202 or the second housing structure 212 to the transceiver 620 in the first area 201 over the hinge structure positioned in the folding area 203. As shown in FIGS. 6A, 6B, 6C, 6D, and 6E, the low noise amplifier 635 may be positioned between the transceiver 620 and the antenna 585, 654.

According to various embodiments shown in FIGS. 6A, 6B, 6C, 6D, and 6E, the low noise amplifier 635 may be provided on the first substrate 401 of the first area 201. In this case, an FRC 637 may be configured to connect the antenna 585, 654 provided in the second housing structure 212 to the low noise amplifier 635 positioned in the first area 201. In addition, the FRC 637 may be configured to connect the low noise amplifier 635 in the first area 201 to the transceiver 620.

According to an embodiment of the disclosure, the first substrate 401 and the second substrate 403 may include connectors (not shown) disposed on positions corresponding to each other, adjacent to the folding area 203, and the FRC 637 may be connected to transmit a signal between the connectors. A conducting wire on the first substrate 401 may be connected between the low noise amplifier 635 and the connector, and a conducting wire on the second substrate 403 may be connected between the connector and the antenna 585, 581, 654.

Figure 6A:
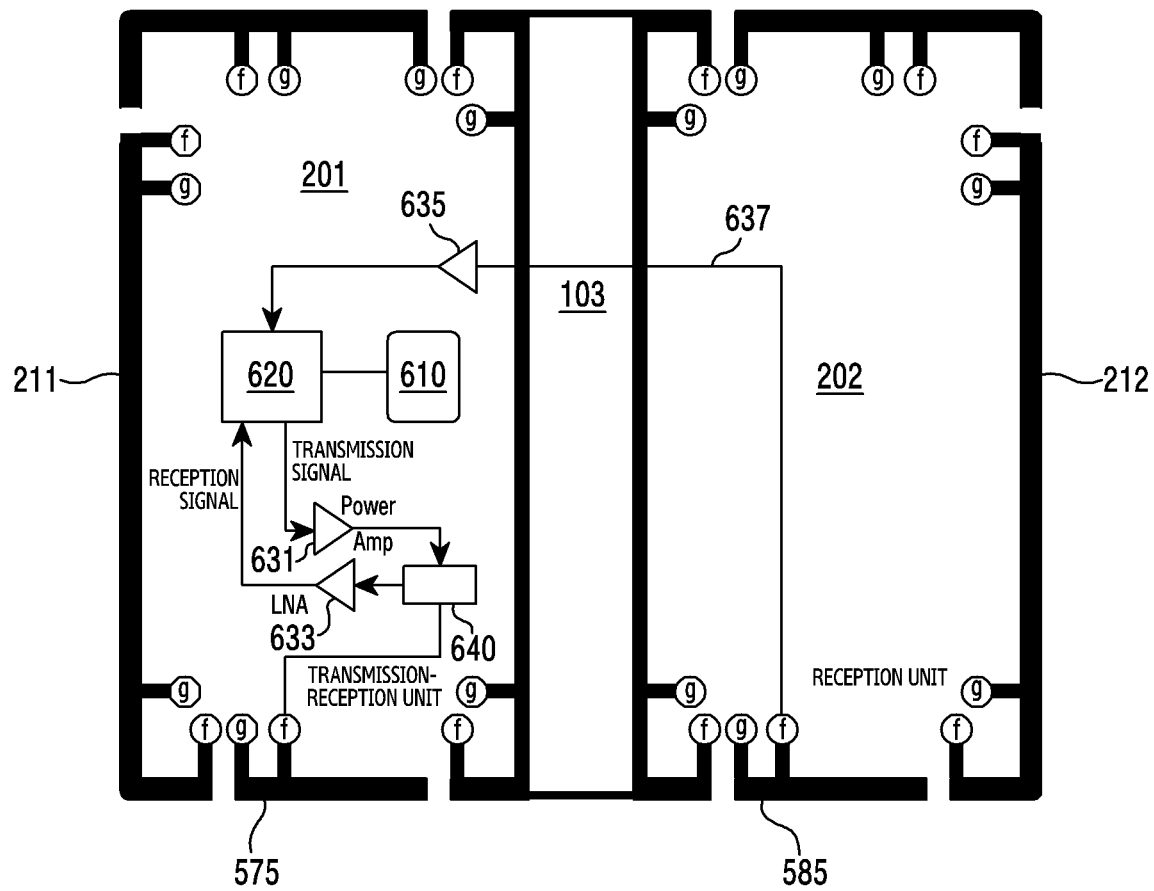
FIG. 6A is a view illustrating a circuit configuration for transmitting and/or receiving a signal in a foldable electronic device according to an embodiment of the disclosure.
Figure 6B:
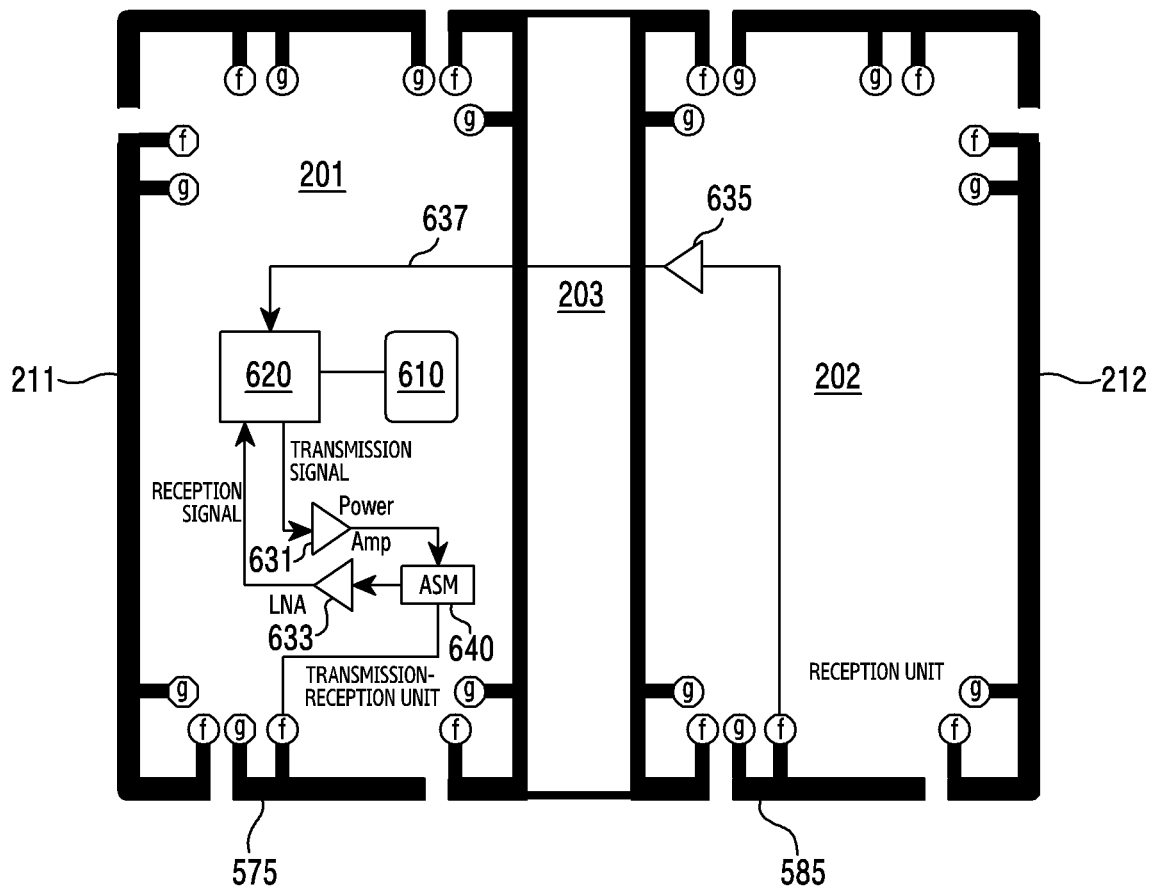
FIG. 6B is a view illustrating a circuit configuration for transmitting and/or receiving a signal in a foldable electronic device according to an embodiment of the disclosure.
Figure 6C:
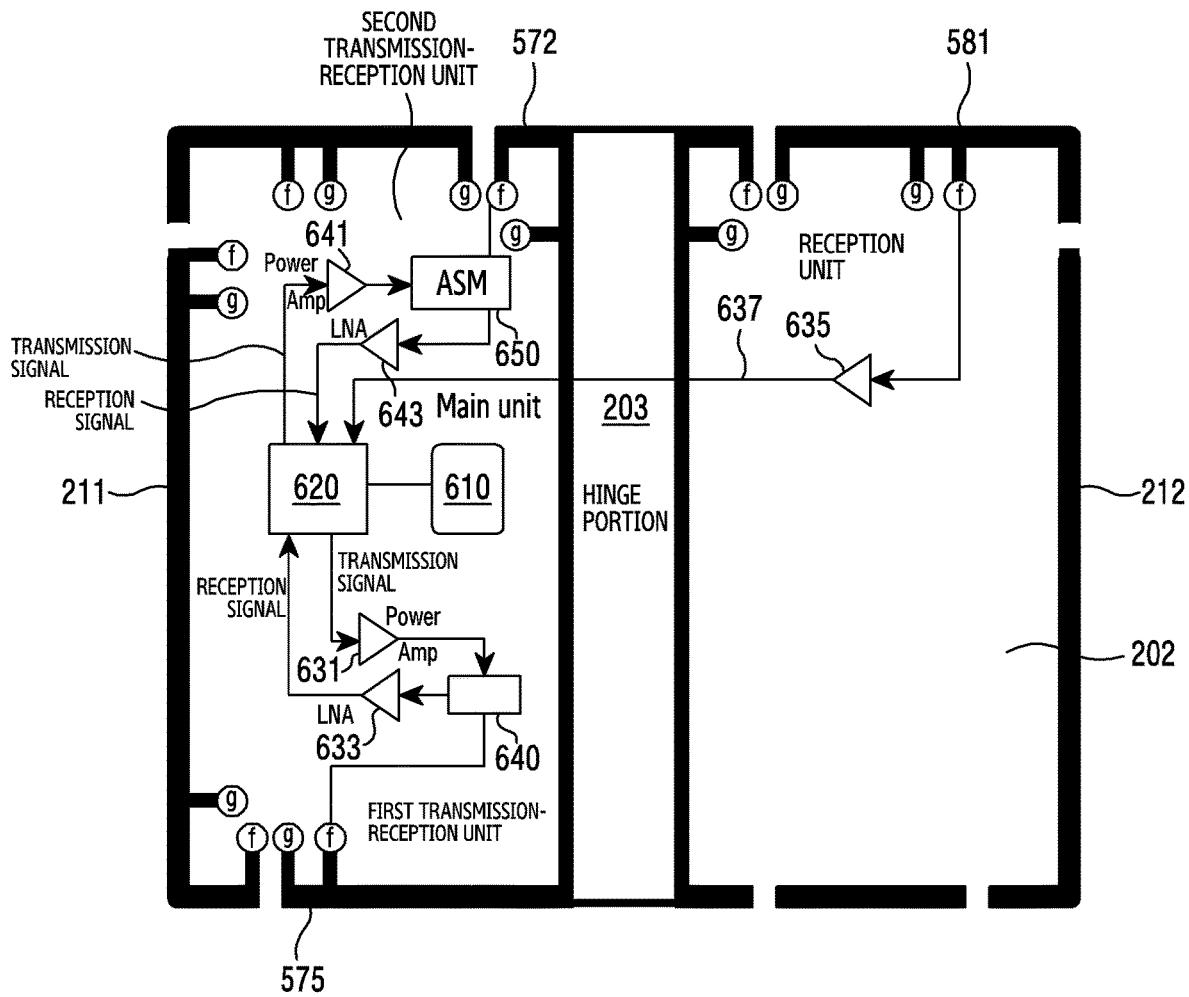
FIG. 6C is a view illustrating a circuit configuration for transmitting and/or receiving a signal in a foldable electronic device according to an embodiment of the disclosure.
Figure 6D:
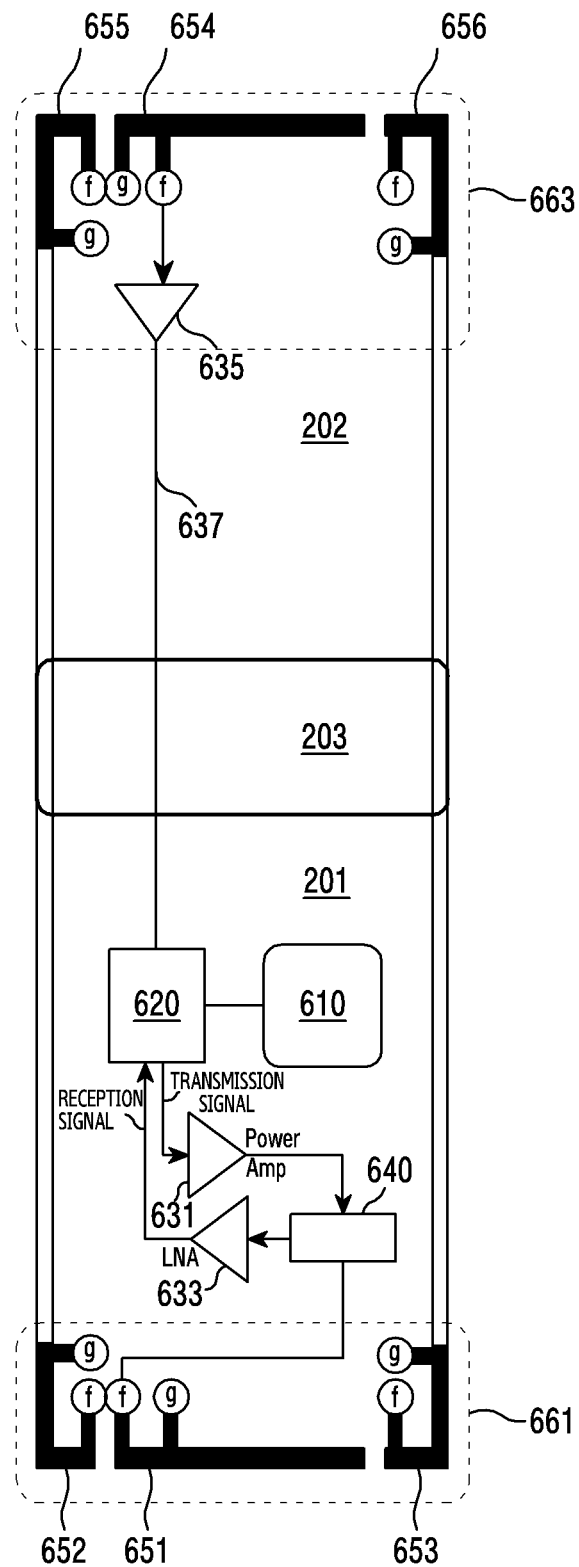
FIG. 6D is a view illustrating a circuit configuration for transmitting and/or receiving a signal in a foldable electronic device according to an embodiment of the disclosure.
Figure 6E:
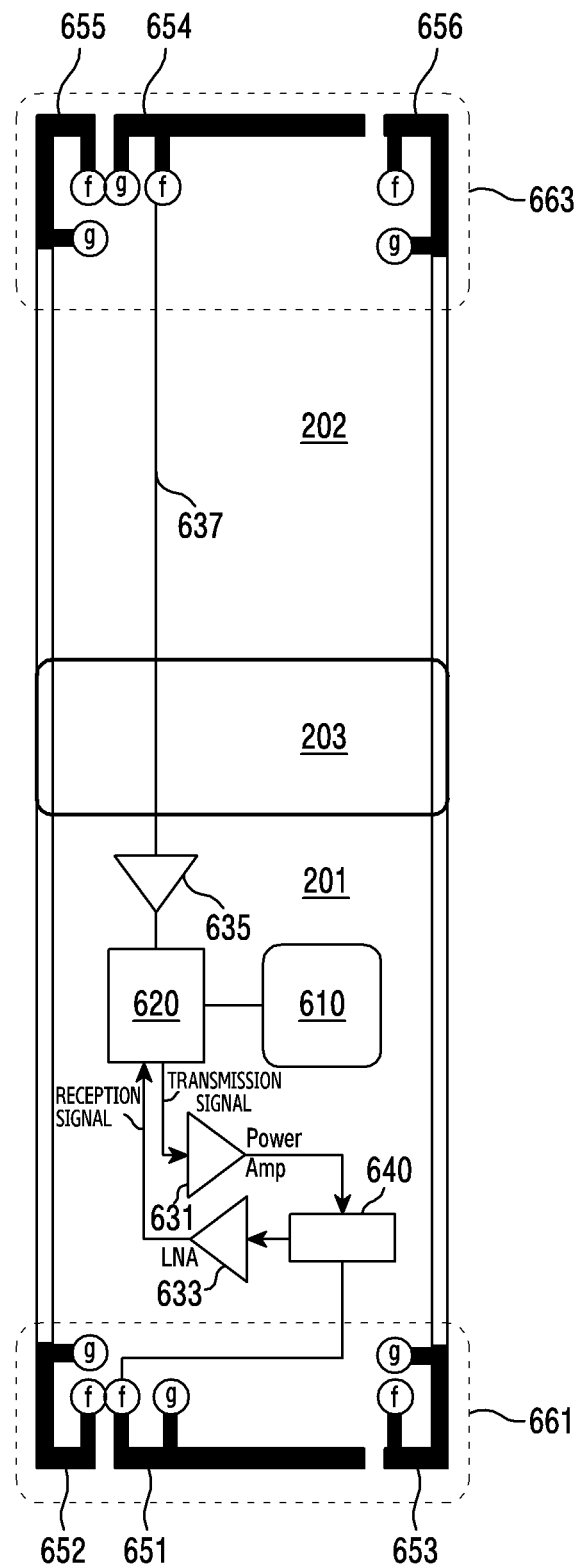
FIG. 6E is a view illustrating a circuit configuration for transmitting and/or receiving a signal in a foldable electronic device according to an embodiment of the disclosure.

According to various embodiments shown in FIG. 6B, 6C, or 6D, the low noise amplifier 635 may be provided on the second substrate 403 of the second area 202. In this case, the FRC 637 may be provided between the transceiver 620 and the low noise amplifier 635. The first substrate 401 and the second substrate 403 may include connectors (not shown) disposed on positions corresponding to each other, adjacent to the folding area 203, and the FRC 637 may be connected to transmit a signal between the connectors. A conducting wire on the first substrate 401 may be connected between the transceiver 620 and the connector, and a conducting wire on the second substrate 403 may be connected between the connector and the low noise amplifier 635.

When the electronic device 101 is in the flat state as shown in FIGS. 5A, 5B, 5C and FIGS. 6A, 6B, 6C, 6D, 6E, the electronic device 10 may use various areas as antennas, so that enhancement of reception performance can be guaranteed. However, when the electronic device 10 is in the folded state, the transmission-reception antenna 575 or 572 or 651 or the transmission antenna 575 or 572 or 651, and the reception antenna 585 or 581 or 654 may come into contact with each other in the electronic device 10. This may cause an RSE problem due to degradation of antenna performance and ineffective frequency amplification.

According to various embodiments of the disclosure, the electronic device 10 may solve degradation of an antenna reception sensitivity and the RSE problem, by controlling an on/off state of the low noise amplifier 635 connected with the reception antenna 585 or 581 or 654. When the low noise amplifier 635 is turned on, a received signal may be delivered to the transceiver 620, and, when the low noise amplifier 635 is turned off, the received signal may not be delivered to the transceiver 620. However, even when a signal received through the reception antenna 585 or 581 or 654 is not delivered to the transceiver 620, the electronic device 10 may receive a signal transmitted from a base station since the signal received through the transmission-reception antenna 575 or 572 or 651 is delivered to the transceiver 620.

According to various embodiments of the disclosure, when the electronic device 10 uses a wireless communication method based on time division duplexing (TDD) method, a processor (not shown) or the communication processor 610 of the electronic device 10 may turn off the low noise amplifier 635 connected with the reception antenna 585 or 581 or 654 at a time when a signal is transmitted.

According to various embodiments of the disclosure, when the electronic device 10 uses a wireless communication method based on a frequency division duplexing (FDD) method, the processor (not shown) or the communication processor 610 of the electronic device 10 cannot use the method of turning off the low noise amplifier 635 connected with the reception antenna 585 or 581 or 654 at the time when a signal is transmitted, like the TDD method. Accordingly, the electronic device 10 may control the low noise amplifier 635 connected with the reception antenna 585 or 581 or 654 to be turned off unconditionally when the electronic device is in the folded state. In another example, when the electronic device 10 is in the folded state and a signal is transmitted through the transmission-reception antenna 575 or 572 or 651, the electronic device 10 may control the low noise amplifier 635 connected with the reception antenna 484 or 581 or 654 to be turned off.

As described above, when a signal is transmitted through the transmission-reception antenna 575 or 572 or 751, the electronic device 10 controls the low noise amplifier 635 connected with the reception antenna 585 or 581 or 654 not to be used, so that a noise can be prevented from flowing into the transceiver 620. In addition, RSE can be enhanced by preventing a multiplication frequency from being generated by the low noise amplifier 635.

An electronic device (e.g., the electronic device 101 shown in FIG. 1) according to an embodiment may include: a housing comprising a first housing structure (e.g., the first housing structure 211 shown in FIG. 2), a second housing structure (e.g., the second housing structure 212 shown in FIG. 2), and a hinge structure (e.g., the hinge cover 215 shown in FIG. 3) connecting the first housing structure and the second housing structure, the housing (e.g., the foldable housing 210 shown in FIG. 2) forming a rear surface and a side surface of the electronic device when the electronic device is in an open state, a display (e.g., the display 200 shown in FIG. 2) seen through a portion of the housing, at least one first antenna (e.g., the antenna 511 to 516 shown in FIG. 5A, the antenna 541 to 545 shown in FIG. 5B, or the antenna 571 to 576 shown in FIG. 5C) formed by using at least a portion of the first housing structure, at least one second antenna (e.g., the antenna 521 to 526 shown in FIG. 5A, the antenna 551 to 555 shown in FIG. 5B, or the antenna 581 to 586 shown in FIG. 5C) formed by using at least a portion of the second housing structure, and at least one processor (e.g., the communication processor 610 shown in FIG. 6A, FIG. 6B, FIG. 6C, FIG. 6D, or FIG. 6E), wherein at least a portion of the first housing structure is formed with a metallic material to form the at least one first antenna, and at least another portion of the first housing structure is formed with a nonmetallic material to form a segment (e.g., the first segments 531, 532, 535, 536 shown in FIG. 5A, the first segments 561 to 564 shown in FIG. 5B, or the first segments 591 to 594 shown in FIG. 5C) to isolate the at least one first antenna, wherein at least a portion of the second housing structure is formed with a metallic material to form the at least one second antenna, and at least another portion of the second housing structure is formed with a nonmetallic material to form a segment (e.g., the second segments 533, 534, 537, 538 shown in FIG. 5A, the second segments 565 to 568 shown in FIG. 5B, or the second segments 595 to 598 shown in FIG. 5C) to isolate the at least one second antenna, wherein the at least one processor is configured to control an on or off state of a second low noise amplifier (e.g., the additional low noise amplifier 635 shown in FIG. 6A, FIG. 6B, FIG. 6C, FIG. 6D, or FIG. 6E), based on at least one of a wireless communication method used by the electronic device, whether the electronic device is in a close state, whether a wireless signal is transmitted through the at least one first antenna, and a strength of a wireless signal received through the at least one first antenna.

According to an embodiment of the disclosure, the at least one first antenna and the at least one second antenna are formed on positions to come into contact with each other when the electronic device is in the close state.

According to an embodiment of the disclosure, the electronic device may further include: a first substrate (e.g., the first substrate 401 shown in FIG. 4) disposed in a space formed by the first housing structure, a second substrate (e.g., the second substrate 403 shown in FIG. 4) disposed in a space formed by the second housing structure, and a transceiver (e.g., the transceiver 620 shown in FIG. 6A, FIG. 6B, FIG. 6C, FIG. 6D, or FIG. 6E) provided on the first substrate, wherein the transceiver is connected with the at least one first antenna through a conducting wire on the first substrate to transmit and receive a wireless signal, and is connected with the at least one second antenna by using an FRC (e.g., the FRC 637 shown in FIG. 6A, FIG. 6B, FIG. 6C, FIG. 6D, or FIG. 6E) to receive a wireless signal.

According to an embodiment of the disclosure, the electronic device may further include: a power amplifier (e.g., the power amplifier 631, 641 shown in FIG. 6A, FIG. 6B, FIG. 6C, FIG. 6D, or FIG. 6E), a first low noise amplifier (e.g., the low noise amplifier 633, 643 shown in FIG. 6A, FIG. 6B, FIG. 6C, FIG. 6D, or FIG. 6E), and a switch (e.g., the switch 640, 650 shown in FIG. 6A, FIG. 6B, FIG. 6C, FIG. 6D, or FIG. 6E) which are provided between the transceiver and the at least one first antenna to transmit and receive the wireless signal, and the second low noise amplifier which is provided between the transceiver and the at least one second antenna to receive the wireless signal.

According to an embodiment of the disclosure, the second low noise amplifier is provided on the first substrate, the transceiver and the second low noise amplifier are connected with each other through the conducting wire of the first substrate, and the second low noise amplifier and the second antenna are connected with each other by using the FRC.

According to an embodiment of the disclosure, the second low noise amplifier is provided on the second substrate, the transceiver and the second low noise amplifier are connected with each other by using the FRC, and the second low noise amplifier and the second antenna are connected with each other through a conducting wire of the second substrate.

According to an embodiment of the disclosure, the at least one processor is configured to turn off the second low noise amplifier during a time period in which the electronic device is in the close state and a wireless signal is transmitted through the at least one first antenna.

According to an embodiment of the disclosure, the at least one processor is configured to turn off the second low noise amplifier when the wireless communication method used by the electronic device is based on FDD by which transmission and reception of signals are simultaneously performed, and the electronic device is in the close state.

According to an embodiment of the disclosure, the at least one processor is configured to turn off the second low noise amplifier during a time period in which the wireless communication method used by the electronic device is based on FDD by which transmission and reception of signals are simultaneously performed, the electronic device is in the close state, and a wireless signal is transmitted through the at least one first antenna.

According to an embodiment of the disclosure, the at least one processor is configured to turn off the second low noise amplifier during a time period in which the wireless communication method used by the electronic device is based on TDD by which transmission and reception of signals are performed in different time periods, the electronic device is in the close state, and a wireless signal is transmitted through the at least one first antenna.

According to an embodiment of the disclosure, the at least one processor is configured to turn off the second low noise amplifier during a time period in which the wireless communication method used by the electronic device is based on TDD by which transmission and reception of signals are performed in different time periods, the electronic device is in the close state, a strength of a wireless signal received through the at least one first antenna is less than a pre-set value, and a wireless signal is transmitted through the at least one first antenna.

According to an embodiment of the disclosure, the at least one processor is configured to turn off the second low noise amplifier when a strength of a wireless signal received through the at least one first antenna is greater than a pre-set value.

Figure 7:
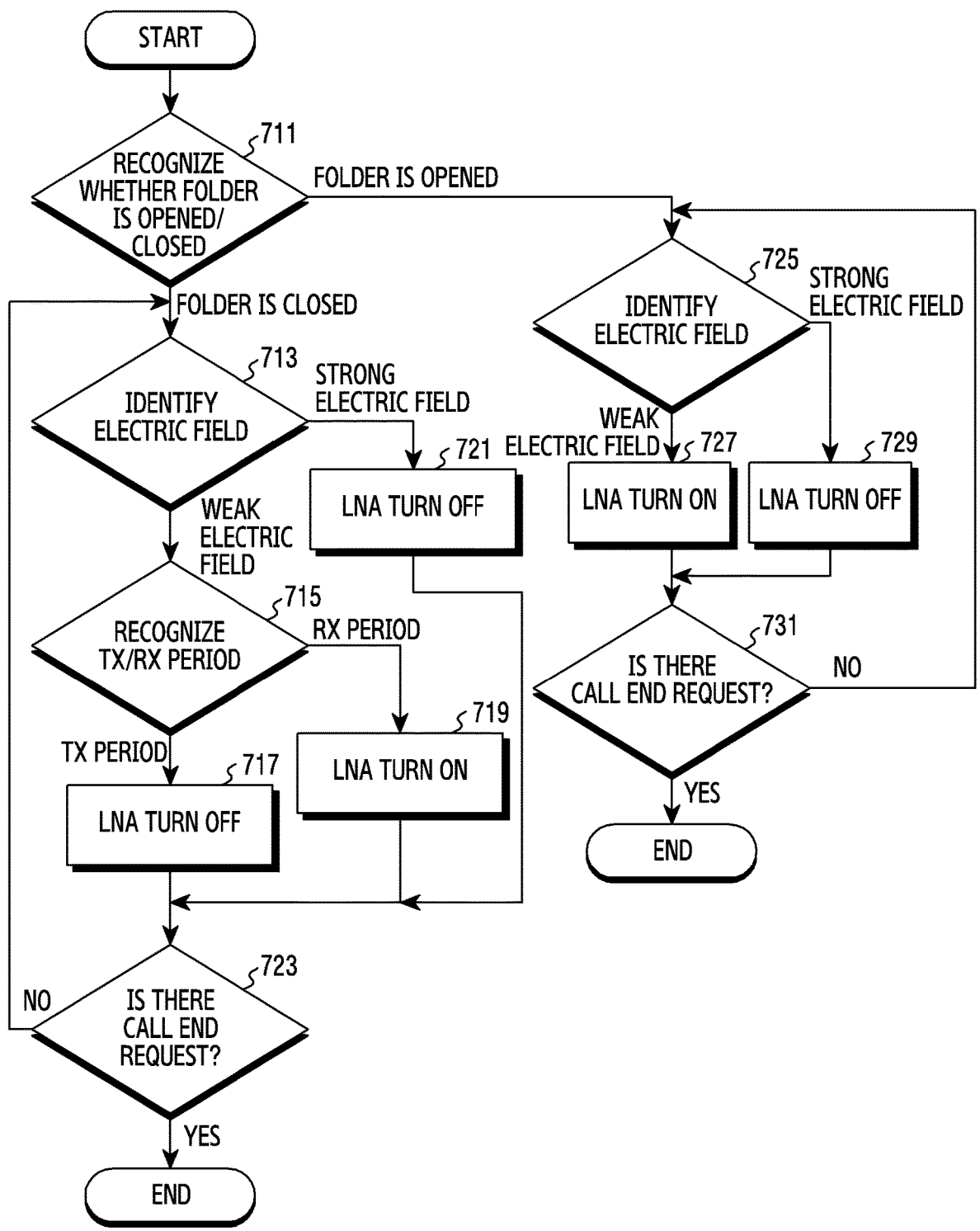
FIG. 7 is a view illustrating a control flow performed in an electronic device which uses a wireless communication method based on time division duplexing (TDD) according to an embodiment of the disclosure.

FIG. 7 is a view illustrating a control flow performed in an electronic device according to an embodiment of the disclosure.

In particular, the control flow shown in FIG. 7 is for an operation for controlling the low noise amplifier 635 connected with the reception antenna 581 or 585 or 654 in the electronic device 10 which uses a wireless communication method based on TDD. An operating entity according to the control flow exemplified in FIG. 7 may be an electronic device (for example, the electronic device 10 of FIG. 1) or a processor (for example, the communication processor 610 of FIGS. 6A, 6B, 6C, 6D, 6E, a generic-purpose processor (not shown)) of the electronic device.

According to an embodiment of the disclosure, when a call connection is started by a base station or the electronic device 10, the electronic device 10 may perform an algorithm according to the control flow illustrated in FIG. 7. According to another embodiment of the disclosure, when it is determined that a transmission signal is required to be transmitted to transmit data, the electronic device 10 may perform the algorithm according to the control flow illustrated in FIG. 7.

Referring to FIG. 7, in operation 711 according to an embodiment of the disclosure, the electronic device 10 may determine whether a current state is a close state or an open state.

When it is determined that the current state of the electronic device 10 is the open state (folder is opened) in operation 711 according to an embodiment of the disclosure, the electronic device 10 may determine whether a current electric field is a strong electric field or a weak electric field in operation 725. For example, the current electric field may be determined as the strong electric field when a strength of a reception signal is greater than a pre-set signal strength, and the current electric field may be determined as the weak electric field when the strength of the reception signal is less than the pre-set signal strength.

When the current electric field is determined as the weak electric field in operation 725 according to an embodiment of the disclosure, the electronic device 10 may turn on the low noise amplifier 635 connected with the reception antenna in operation 727. On the other hand, when the current electric field is determined as the strong electric field, the electronic device 10 may turn off the low noise amplifier 635 connected with the reception antenna in operation 729.

In operation 731 according to an embodiment of the disclosure, the electronic device 10 may monitor whether there is a call end request or a request for completion of data transmission. The electronic device 10 may maintain the control operation by operation 727 or 729 until there is the call end request or the request for completion of data transmission. When there is the call end request or the request for completion of data transmission, the electronic device 10 may finish all operations and then may change the state of the low noise amplifier 635 into the on-state or may maintain the state of the low noise amplifier 635.

According to an embodiment of the disclosure, when the current state is the open state, the electronic device 10 may always turn on the low noise amplifier 635 regardless of whether the current electric field is the storing electric field or the weak electric field.

When it is determined that the current state is the close state (folder is closed) in operation 711 according to an embodiment of the disclosure, the electronic device 10 may determine whether a current electric field is a strong electric field or a weak electric field in operation 713. For example, the electronic device 10 may determine that the current electric field is the strong electric field when a strength of a reception signal is greater than a pre-set signal strength, and may determine that the current electric field is the weak electric field when the strength of the reception signal is less than the pre-set signal strength.

When it is determined that the current electric field is the strong electric field in operation 713 according to an embodiment of the disclosure, the electronic device 10 may turn off the low noise amplifier 635 connected with the reception antenna in operation 721. For example, when the current electric field is the strong electric field, the electronic device 10 may turn off the low noise amplifier 635 since a high signal strength can be guaranteed only by receiving a signal through the transmission-reception antenna 572, 575, 651.

When it is determined that the current electric field is the weak electric field in operation 713 according to an embodiment of the disclosure, the electronic device 10 may determine whether a current time period is a period for transmitting a signal (Tx) or a period for receiving a signal (Rx) in operation 715 according to an embodiment. When the current time period is the Tx period, the electronic device 10 may turn off the low noise amplifier 635 connected with the reception antenna in operation 717 according to an embodiment of the disclosure, and, when the current time period is the Rx period, the electronic device 10 may turn on the low noise amplifier 635 connected with the reception antenna in operation 719 according to an embodiment of the disclosure.

In operation 723 according to an embodiment of the disclosure, the electronic device 10 may monitor whether there is a call end request or a request for completion of data transmission. The electronic device 10 may maintain the control operation by operation 717, 719 or 721 according to an embodiment until there is the call end request or the request for completion of data transmission. When there is the call end request or the request for completion of data transmission, the electronic device 10 may finish all operations and then may change the state of the low noise amplifier 635 to the on-state or may maintain the state of the low noise amplifier 635.

Figure 8:
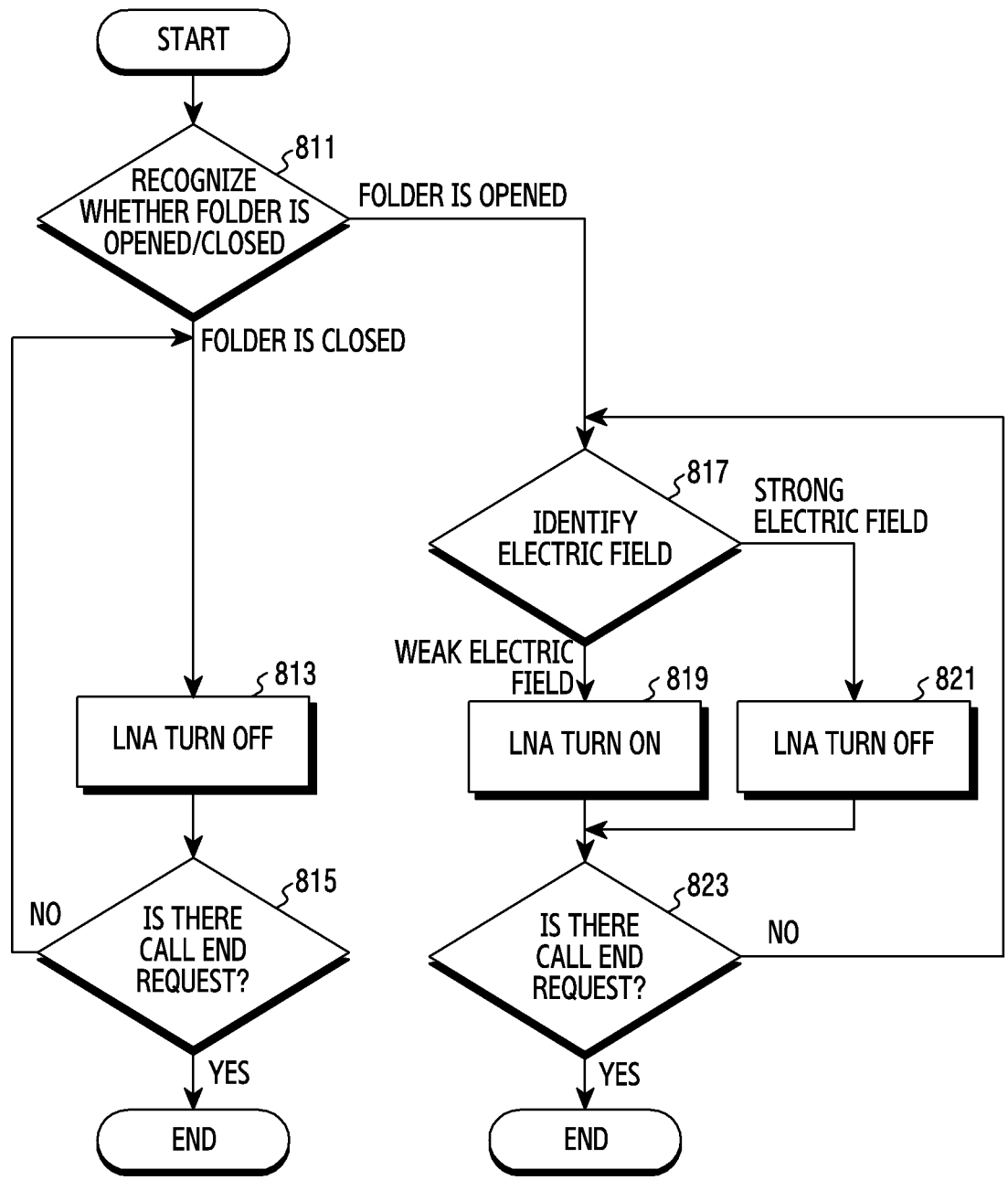
FIG. 8 is a view illustrating a control flow performed in an electronic device which uses a wireless communication method based on frequency division duplexing (FDD) according to an embodiment of the disclosure.

FIG. 8 is a view illustrating a control flow performed in an electronic device according to an embodiment of the disclosure.

In particular, the control flow shown in FIG. 8 is for an operation for controlling the low noise amplifier 635 connected with the reception antenna 581 or 585 or 654 in the electronic device 10 which uses a wireless communication method based on FDD. An operating entity of the control flow exemplified in FIG. 8 may be an electronic device (for example, the electronic device 10 of FIG. 1) or a processor (for example, the communication processor 610 of FIGS. 6A, 6B, 6C, 6D, 6E, a generic-purpose processor (not shown)) of the electronic device.

According to various embodiments of the disclosure, when a call connection is started by a base station or the electronic device 10, the electronic device 10 may perform an algorithm according to the control flow shown in FIG. 8. According to another embodiment of the disclosure, when it is determined that a transmission signal is required to be transmitted to transmit data, the electronic device 10 may perform the algorithm according to the control flow shown in FIG. 8.

Referring to FIG. 8, in operation 811 according to an embodiment of the disclosure, the electronic device 10 may determine whether a current state is a close state or an open state.

When it is determined that the current state is the open state (folder is opened) in operation 811 according to an embodiment of the disclosure, the electronic device 10 may determine whether a current electric field is a strong electric field or a weak electric filed in operation 817. For example, the current electric field may be determined as the strong electric field when a strength of a reception signal is greater than a pre-set signal strength, and the current electric field may be determined as the weak electric field when the strength of the reception signal is less than the pre-set signal strength.

When the current electric field is determined as the weak electric field in operation 817 according to an embodiment of the disclosure, the electronic device 10 may turn on the low noise amplifier 635 connected with the reception antenna in operation 819. On the other hand, when the current electric field is determined as the strong electric field, the electronic device 10 may turn off the low noise amplifier 635 connected with the reception antenna in operation 821.

In operation 823 according to an embodiment of the disclosure, the electronic device 10 may monitor whether there is a call end request or a request for completion of data transmission. The electronic device 10 may control the control operation by operation 819 or 821 until there is the call end request or the request for completion of data transmission. When there is the call end request or the request for completion of data transmission, the electronic device 10 may finish all operations and then may change the state of the low noise amplifier 635 into the on-state or may maintain the state of the low noise amplifier 635.

When the current state is the open state, the electronic device 10 according to an embodiment may always turn on the low noise amplifier 635 regardless of whether the electric field is the strong electric field or the weak electric field.

In operation 811 according to an embodiment of the disclosure, when it is determined that the current state is the close state (folder is closed), the electronic device 10 may turn off the low noise amplifier 635 connected with the reception antenna in operation 813.

In operation 815 according to an embodiment of the disclosure, the electronic device 10 may monitor whether there is a call end request or a request for completion of data transmission. The electronic device 10 may maintain the control operation by operation 813 until there is the call end request or the request for completion of data transmission. When there is the call end request or the request for completion of data transmission, the electronic device 10 may finish all operations and then may change the state of the low noise amplifier 635 to the on-state or may maintain the state of the low noise amplifier 635.

When the electronic device 10 transmits a signal according to the above-described method, the electronic device 10 can suppress generation of a noise and a multiplication frequency signal which may be caused by the transmission signal flowing into the low noise amplifier 635, by controlling the on/off state of the low noise amplifier 635 connected with the reception antenna, so that degradation of a reception sensitivity and an RSE problem can be prevented.

An operating method of an electronic device (e.g., the electronic device 101 shown in FIG. 1) which comprises at least one first antenna configured to transmit and receive a wireless signal, and at least one second antenna configured to receive a wireless signal, in accordance with an embodiment may include: a first determination operation of determining whether the electronic device is in a close state or an open state, a second determination operation of determining whether a wireless communication method used by the electronic device is based on TDD or FDD, a third determination operation of determining whether a wireless signal is transmitted through the at least one first antenna, a fourth determination operation of determining whether a strength of a wireless signal received through the at least one first antenna is greater than or equal to a pre-set value, and an operation of controlling an on or off state of the at least one second antenna, based on a result of at least one determination operation of the first determination operation, the second determination operation, the third determination operation, and the fourth determination operation.

According to an embodiment of the disclosure, the operation of controlling the on or off state of the at least one second antenna comprises an operation of turning off the at least one second antenna during a time period in which the electronic device is in the close state and the wireless signal is transmitted through the at least one first antenna.

According to an embodiment of the disclosure, the operation of controlling the on or off state of the at least one second antenna comprises an operation of turning off the at least one second antenna when the electronic device is in the close state and the wireless communication method used by the electronic device is based on FDD.

According to an embodiment of the disclosure, the operation of controlling the on or off state of the at least one second antenna comprises an operation of turning off the at least one second antenna during a time period in which the electronic device is in the close state, the wireless communication method used by the electronic device is based on FDD, and the wireless signal is transmitted through the at least one first antenna.

According to an embodiment of the disclosure, the operation of controlling the on or off state of the at least one second antenna comprises an operation of turning off the at least one second antenna during a time period in which the electronic device is in the close state, the wireless communication method used by the electronic device is based on TDD, and the wireless signal is transmitted through the at least one first antenna.

According to an embodiment of the disclosure, the operation of controlling the on or off state of the at least one second antenna comprises an operation of turning off the at least one second antenna during a time period in which the electronic device is in the close state, the wireless communication method used by the electronic device is based on TDD, and the wireless signal is transmitted through the at least one first antenna, and when the strength of the wireless signal received through the at least one first antenna is less than the pre-set value.

According to an embodiment of the disclosure, the operation of controlling the on or off state of the at least one second antenna comprises an operation of turning off the at least one second antenna when the strength of the wireless signal received through the at least one first antenna is greater than the pre-set value.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing comprising a first housing structure, a second housing structure, and a hinge structure connecting the first housing structure and the second housing structure, the housing forming a rear surface and a side surface of the electronic device when the electronic device is in an open state;
   a display seen through a portion of the housing;
   at least one first antenna formed by using at least a portion of the first housing structure;
   at least one second antenna formed by using at least a portion of the second housing structure; and
   at least one processor,
   wherein at least a portion of the first housing structure is formed with a metallic material to form the at least one first antenna, and at least another portion of the first housing structure is formed with a nonmetallic material to form a segment to isolate the at least one first antenna,
  wherein at least a portion of the second housing structure is formed with a metallic material to form the at least one second antenna, and at least another portion of the second housing structure is formed with a nonmetallic material to form a segment to isolate the at least one second antenna, and
  wherein the at least one processor is configured to:
    identify whether the electronic device is in a close state,
    determine a wireless communication scheme used by the electronic device, and
    control an on or off state of a second low noise amplifier electrically connected to the at least one second antenna, based on whether the electronic device is in the close state and the determined wireless communication scheme.

2. The electronic device of claim 1, wherein the at least one first antenna and the at least one second antenna are formed on positions to come into contact with each other when the electronic device is in the close state.

3. The electronic device of claim 1, further comprising:
  a first substrate disposed in a space formed by the first housing structure;
  a second substrate disposed in a space formed by the second housing structure; and
  a transceiver provided on the first substrate,
  wherein the transceiver is connected with the at least one first antenna through a conducting wire on the first substrate to transmit and receive a wireless signal, and is connected with the at least one second antenna by using a flexible radio frequency (RF) cable (FRC) to receive a wireless signal.

4. The electronic device of claim 3, further comprising:
  a power amplifier, a first low noise amplifier, and a switch which are provided between the transceiver and the at least one first antenna to transmit and receive the wireless signal; and
  the second low noise amplifier which is provided between the transceiver and the at least one second antenna to receive the wireless signal.

5. The electronic device of claim 4, wherein the second low noise amplifier is provided on the first substrate, the transceiver and the second low noise amplifier are connected with each other through the conducting wire of the first substrate, and the second low noise amplifier and the at least one second antenna are connected with each other by using the FRC.

6. The electronic device of claim 4, wherein the second low noise amplifier is provided on the second substrate, the transceiver and the second low noise amplifier are connected with each other by using the FRC, and the second low noise amplifier and the at least one second antenna are connected with each other through a conducting wire of the second substrate.

7. The electronic device of claim 1, wherein the at least one processor is further configured to turn off the second low noise amplifier during a time period in which the electronic device is in the close state and a wireless signal is transmitted through the at least one first antenna.

8. The electronic device of claim 1, wherein the at least one processor is further configured to turn off the second low noise amplifier when the wireless communication scheme used by the electronic device is based on frequency division duplexing (FDD) by which transmission and reception of signals are simultaneously performed, and the electronic device is in the close state.

9. The electronic device of claim 1, wherein the at least one processor is further configured to turn off the second low noise amplifier during a time period in which the wireless communication scheme used by the electronic device is based on frequency division duplexing (FDD) by which transmission and reception of signals are simultaneously performed, the electronic device is in the close state, and a wireless signal is transmitted through the at least one first antenna.

10. The electronic device of claim 1, wherein the at least one processor is further configured to turn off the second low noise amplifier during a time period in which the wireless communication scheme used by the electronic device is based on time division duplexing (TDD) by which transmission and reception of signals are performed in different time periods, the electronic device is in the close state, and a wireless signal is transmitted through the at least one first antenna.

11. The electronic device of claim 1, wherein the at least one processor is further configured to turn off the second low noise amplifier during a time period in which the wireless communication scheme used by the electronic device is based on time division duplexing (TDD) by which transmission and reception of signals are performed in different time periods, the electronic device is in the close state, a strength of a wireless signal received through the at least one first antenna is less than a pre-set value, and a wireless signal is transmitted through the at least one first antenna.

12. The electronic device of claim 1, wherein the at least one processor is further configured to turn off the second low noise amplifier when a strength of a wireless signal received through the at least one first antenna is greater than a pre-set value.

13. A method of an electronic device which comprises at least one first antenna configured to transmit and receive a wireless signal, and at least one second antenna configured to receive a wireless signal, the method comprising:
  determining whether the electronic device is in a close state or an open state;
  determining whether a wireless communication scheme used by the electronic device is based on time division duplexing (TDD) or frequency division duplexing (FDD); and
  controlling an on or off state of a low noise amplifier connected to the at least one second antenna, based on whether the electronic device is in the close state or the open state and whether the wireless communication scheme is based on the TDD or the FDD.

14. The method of claim 13, wherein the controlling of the on or off state of the low noise amplifier comprises turning off the at least one second antenna during a time period in which the electronic device is in the close state and a wireless signal is transmitted through the at least one first antenna.

15. The method of claim 13, wherein the controlling of the on or off state of the low noise amplifier comprises turning off the at least one second antenna when the electronic device is in the close state and the wireless communication scheme used by the electronic device is based on FDD.

16. The method of claim 13, wherein the controlling of the on or off state of the low noise amplifier comprises turning off the at least one second antenna during a time period in which the electronic device is in the close state, the wireless communication scheme used by the electronic device is based on FDD, and a wireless signal is transmitted through the at least one first antenna.

17. The method of claim 13, wherein the controlling of the on or off state of the low noise amplifier comprises turning off the at least one second antenna during a time period in which the electronic device is in the close state, the wireless communication scheme used by the electronic device is based on TDD, and a wireless signal is transmitted through the at least one first antenna.

18. The method of claim 13, wherein the controlling of the on or off state of the low noise amplifier comprises turning off the at least one second antenna during a time period in which the electronic device is in the close state, the wireless communication scheme used by the electronic device is based on TDD, and a wireless signal is transmitted through the at least one first antenna, and when a strength of a wireless signal received through the at least one first antenna is less than a pre-set value.

19. The method of claim 13, wherein the controlling of the on or off state of the low noise amplifier comprises turning off the at least one second antenna when a strength of a wireless signal received through the at least one first antenna is greater than a pre-set value.

20. The method of claim 13, further comprising:
  turning off the low noise amplifier when a strength of a wireless signal received through the at least one first antenna is greater than a pre-set value.

\* \* \* \* \*